US012649875B2

(12) United States Patent　　(10) Patent No.:　US 12,649,875 B2
Benish et al.　　(45) Date of Patent:　Jun. 9, 2026

(54) HYDRAULIC FRACTURING METHODS UTILIZING FRACTURING FLUIDS COMPRISING COKE PROPPANT PARTICLES AND LOW-BASE-VISCOSITY CARRIER FLUID

(71) Applicant: ExxonMobil Technology and Engineering Company, Spring, TX (US)

(72) Inventors: Timothy G. Benish, Spring, TX (US); Robert M. Shirley, The Woodlands, TX (US); James S. Brown, Sugar Land, TX (US); P. Matthew Spiecker, Manvel, TX (US); Kendal K. Decker, Spring, TX (US); Mohan G. Kulkarni, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/675,694

(22) Filed: May 28, 2024

(65) Prior Publication Data

US 2025/0236787 A1　　Jul. 24, 2025

Related U.S. Application Data

(63) Continuation-in-part of application No. 18/417,492, filed on Jan. 19, 2024, now abandoned, and a
(Continued)

(51) Int. Cl.
*E21B 43/267*　　(2006.01)
*C09K 8/64*　　(2006.01)
(Continued)

(52) U.S. Cl.
CPC .................. *C09K 8/80* (2013.01); *C09K 8/64* (2013.01); *C09K 8/66* (2013.01); *C09K 8/70* (2013.01); *E21B 43/267* (2013.01)

(58) Field of Classification Search
CPC ........... E21B 43/267; C09K 8/64; C09K 8/66; C09K 8/70; C09K 8/80
See application file for complete search history.

(56) References Cited

U.S. PATENT DOCUMENTS

| | | | |
|---|---|---|---|
| 1,754,765 | A | 4/1930 | Parr et al. |
| 3,089,542 | A | 5/1963 | Kolodny |

(Continued)

FOREIGN PATENT DOCUMENTS

| | | |
|---|---|---|
| CA | 684454 A | 4/1964 |
| CA | 2863283 A1 | 3/2015 |

(Continued)

OTHER PUBLICATIONS

A. Abrams, "Mud Design To Minimize Rock Impairment Due To Particle Invasion", J Pet Technol 29 (05): 586-592, May 1, 1977.

(Continued)

*Primary Examiner* — Matthew R Buck
(74) *Attorney, Agent, or Firm* — Troutman Pepper Locke LLP; John Morrissett; Scott A. Bergeson

(57) ABSTRACT

A method comprises hydraulically fracturing a subterranean formation by introducing a fracturing fluid comprising coke proppant particles and a carrier fluid into the formation, where the carrier fluid has a base viscosity of at most 0.8 centipoise (cP) at 25 degrees Celsius (° C.). A hydrocarbon well comprises a wellbore that extends within a formation, a production casing string that extends within the wellbore, perforation clusters formed within the production casing string, hydraulic fractures formed in the formation proximate to the perforation clusters, and a fracturing fluid
(Continued)

comprising coke proppant particles and a carrier fluid within at least a portion of the hydraulic fractures, where the carrier fluid has a base viscosity of at most 0.8 cP at 25° C. Another method comprises providing a carrier fluid having a viscosity of at most 0.8 cP at 25° C. and forming a fracturing fluid comprising the carrier fluid and coke proppant particles.

35 Claims, 4 Drawing Sheets

Related U.S. Application Data continuation-in-part of application No. 18/417,488, filed on Jan. 19, 2024, now abandoned, and a continuation-in-part of application No. 18/417,478, filed on Jan. 19, 2024, now abandoned, and a continuation-in-part of application No. 18/417,483, filed on Jan. 19, 2024, now abandoned, and a continuation-in-part of application No. 18/417,433, filed on Jan. 19, 2024, now abandoned.

(51) Int. Cl.
| | |
|---|---|
| *C09K 8/66* | (2006.01) |
| *C09K 8/70* | (2006.01) |
| *C09K 8/80* | (2006.01) |

(56) References Cited

U.S. PATENT DOCUMENTS

| | | | |
|---|---|---|---|
| 3,283,817 A | | 11/1966 | Roberts |
| 3,659,651 A | * | 5/1972 | Graham ............... E21B 43/267 |
| | | | 507/924 |
| 3,661,543 A | | 5/1972 | Saxton |
| 3,664,420 A | * | 5/1972 | Graham ................... C09K 8/80 |
| | | | 166/280.2 |
| 3,700,032 A | * | 10/1972 | Terry ...................... E21B 43/26 |
| | | | 166/308.1 |
| 3,702,516 A | | 11/1972 | Luckenbach |
| 3,759,676 A | | 9/1973 | Lahn |
| 3,816,084 A | | 6/1974 | Moser et al. |
| 4,036,750 A | | 7/1977 | Jaros et al. |
| 4,269,696 A | | 5/1981 | Metrailer |
| 4,741,840 A | | 5/1988 | Atherton et al. |
| 4,796,701 A | | 1/1989 | Hudson et al. |
| 4,957,174 A | | 9/1990 | Whitfill et al. |
| 5,189,102 A | | 2/1993 | Tsubuko et al. |
| 5,215,143 A | | 6/1993 | Gentry |
| 5,604,184 A | | 2/1997 | Ellis et al. |
| 5,889,137 A | | 3/1999 | Hutchings et al. |
| 5,899,272 A | | 5/1999 | Loree |
| 6,016,879 A | | 1/2000 | Burts, Jr. |
| 6,035,936 A | | 3/2000 | Whalen |
| 6,059,034 A | | 5/2000 | Rickards et al. |
| 6,283,212 B1 | | 9/2001 | Hinkel et al. |
| 6,330,916 B1 | | 12/2001 | Rickards et al. |
| 6,720,290 B2 | | 4/2004 | England et al. |
| 6,825,152 B2 | | 11/2004 | Green |
| 7,073,581 B2 | | 7/2006 | Nguyen et al. |
| 7,210,528 B1 | | 5/2007 | Brannon et al. |
| 7,237,609 B2 | | 7/2007 | Nguyen |
| 7,249,500 B2 | | 7/2007 | Dutton et al. |
| 7,255,169 B2 | | 8/2007 | van Batenburg et al. |
| 7,270,879 B2 | | 9/2007 | McCrary |
| 7,325,608 B2 | | 2/2008 | van Batenburg et al. |
| 7,334,635 B2 | | 2/2008 | Nguyen |
| 7,337,839 B2 | | 3/2008 | Ayoub et al. |
| 7,424,911 B2 | | 9/2008 | McCarthy et al. |
| 7,450,053 B2 | | 11/2008 | Funk et al. |
| 7,472,751 B2 | | 1/2009 | Brannon et al. |
| 7,494,711 B2 | | 2/2009 | Kaufman et al. |
| 7,521,389 B2 | | 4/2009 | Shmotev et al. |
| 7,527,097 B2 | | 5/2009 | Patel |
| 7,528,096 B2 | | 5/2009 | Brannon et al. |
| 7,541,318 B2 | | 6/2009 | Weaver et al. |
| 7,568,524 B2 | | 8/2009 | Blackburn et al. |
| 7,598,898 B1 | | 10/2009 | Funk et al. |
| 7,612,021 B2 | | 11/2009 | Chatterji et al. |
| 7,648,934 B2 | | 1/2010 | Shmotev et al. |
| 7,669,657 B2 | | 3/2010 | Symington et al. |
| 7,699,106 B2 | | 4/2010 | Brannon et al. |
| 7,703,531 B2 | | 4/2010 | Huang et al. |
| 7,721,803 B2 | | 5/2010 | Huang et al. |
| 7,726,399 B2 | | 6/2010 | Brannon et al. |
| 7,727,940 B2 | | 6/2010 | Reddy et al. |
| 7,735,556 B2 | | 6/2010 | Misselbrook et al. |
| 7,772,163 B1 | | 8/2010 | Brannon et al. |
| 7,789,147 B2 | | 9/2010 | Brannon et al. |
| 7,790,656 B2 | | 9/2010 | Windebank et al. |
| 7,825,053 B2 | | 11/2010 | Duenckel et al. |
| 7,833,947 B1 | | 11/2010 | Kubala |
| 7,841,411 B2 | | 11/2010 | Fuller et al. |
| 7,900,702 B2 | | 3/2011 | Reddy et al. |
| 7,918,277 B2 | | 4/2011 | Brannon et al. |
| 7,954,548 B2 | | 6/2011 | Curimbaba et al. |
| 7,971,644 B2 | | 7/2011 | Ladva et al. |
| 8,003,214 B2 | | 8/2011 | Rediger et al. |
| 8,006,755 B2 | | 8/2011 | Bicerano |
| 8,058,213 B2 | | 11/2011 | Rediger et al. |
| 8,061,427 B2 | | 11/2011 | Jackson et al. |
| 8,063,000 B2 | | 11/2011 | Wilson |
| 8,082,994 B2 | | 12/2011 | Nguyen et al. |
| 8,091,637 B2 | | 1/2012 | Fripp |
| 8,104,537 B2 | | 1/2012 | Kaminsky |
| 8,113,283 B2 | | 2/2012 | Welton et al. |
| 8,127,844 B2 | | 3/2012 | Luharuka et al. |
| 8,127,849 B2 | | 3/2012 | Gupta |
| 8,127,850 B2 | | 3/2012 | Brannon et al. |
| 8,167,043 B2 | | 5/2012 | Willberg et al. |
| 8,178,477 B2 | | 5/2012 | Skala et al. |
| 8,227,026 B2 | | 7/2012 | McDaniel et al. |
| 8,236,737 B2 | | 8/2012 | Fan et al. |
| 8,240,383 B2 | | 8/2012 | Xu et al. |
| 8,281,857 B2 | | 10/2012 | Willberg et al. |
| 8,291,978 B2 | | 10/2012 | Hutchins et al. |
| 8,327,940 B2 | | 12/2012 | Boronin et al. |
| 8,354,939 B2 | | 1/2013 | McDaniel et al. |
| 8,360,149 B2 | | 1/2013 | Hughes et al. |
| 8,361,373 B1 | | 1/2013 | Byron |
| 8,420,578 B2 | | 4/2013 | Usova et al. |
| 8,459,353 B2 | | 6/2013 | Hughes et al. |
| 8,496,057 B2 | | 7/2013 | Ferrero et al. |
| 8,540,024 B2 | | 9/2013 | Kosarev et al. |
| 8,584,755 B2 | | 11/2013 | Willberg et al. |
| 8,596,355 B2 | | 12/2013 | Kaminsky et al. |
| 8,596,361 B2 | | 12/2013 | Willberg et al. |
| 8,596,362 B2 | | 12/2013 | Nelson |
| 8,603,578 B2 | | 12/2013 | Smith et al. |
| 8,607,870 B2 | | 12/2013 | Gu et al. |
| 8,613,314 B2 | | 12/2013 | Garcia-Lopez de Victoria et al. |
| 8,614,157 B2 | | 12/2013 | Pope et al. |
| 8,701,774 B2 | | 4/2014 | Johnson, Sr. |
| 8,739,878 B2 | | 6/2014 | Brannon et al. |
| 8,770,294 B2 | | 7/2014 | Tanguay et al. |
| 8,772,207 B2 | | 7/2014 | Geary et al. |
| 8,869,888 B2 | | 10/2014 | Cramer et al. |
| 8,931,553 B2 | | 1/2015 | Cannan et al. |
| 8,936,083 B2 | | 1/2015 | Nguyen |
| 8,944,164 B2 | | 2/2015 | Veldman et al. |
| 8,959,954 B2 | | 2/2015 | Koseski et al. |
| 8,960,284 B2 | | 2/2015 | Nguyen et al. |
| 8,978,764 B2 | | 3/2015 | Dusseault et al. |
| 8,993,489 B2 | | 3/2015 | McDaniel et al. |
| 9,010,424 B2 | | 4/2015 | Agrawal et al. |
| 9,023,770 B2 | | 5/2015 | Todd et al. |
| 9,080,441 B2 | | 7/2015 | Meurer et al. |
| 9,091,161 B2 | | 7/2015 | Brannon |
| 9,096,790 B2 | | 8/2015 | McCrary et al. |
| 9,097,097 B2 | | 8/2015 | DiFoggio et al. |
| 9,102,867 B2 | | 8/2015 | Parse et al. |
| 9,109,992 B2 | | 8/2015 | Wang |
| 9,140,118 B2 | | 9/2015 | Kulkarni et al. |

(56) References Cited

U.S. PATENT DOCUMENTS

| | | | |
|---|---|---|---|
| 9,145,513 B2 | 9/2015 | Pershikova et al. |
| 9,175,210 B2 | 11/2015 | Eldred et al. |
| 9,175,529 B2 | 11/2015 | Jamison et al. |
| 9,228,041 B2 | 1/2016 | Martinez-Castro et al. |
| 9,234,127 B2 | 1/2016 | De Paiva Cortes et al. |
| 9,234,415 B2 | 1/2016 | Hughes et al. |
| 9,243,491 B2 | 1/2016 | McDaniel et al. |
| 9,290,689 B2 | 3/2016 | Lafitte et al. |
| 9,291,045 B2 | 3/2016 | Wheeler et al. |
| 9,315,719 B2 | 4/2016 | Fang et al. |
| 9,322,269 B2 | 4/2016 | Matherly et al. |
| 9,353,613 B2 | 5/2016 | Soliman et al. |
| 9,388,334 B2 | 7/2016 | Hughes et al. |
| 9,458,710 B2 | 10/2016 | Makarychev-Mikhailov et al. |
| 9,523,268 B2 | 12/2016 | Potapenko et al. |
| 9,556,376 B2 | 1/2017 | Huang et al. |
| 9,574,130 B2 | 2/2017 | Gupta |
| 9,611,423 B2 | 4/2017 | Zhang et al. |
| 9,631,137 B2 | 4/2017 | Fuss et al. |
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 * | 3/2020 | Sen ..................... E21B 43/267 |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 * | 8/2020 | Nguyen ................. C09K 8/665 |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |

(56) References Cited

U.S. PATENT DOCUMENTS

| | | | |
|---|---|---|---|
| 10,975,295 B2 | 4/2021 | Cannan et al. | |
| 10,984,156 B2 | 4/2021 | Wu et al. | |
| 10,988,674 B2 | 4/2021 | Nguyen et al. | |
| 10,988,679 B2 | 4/2021 | Calvin | |
| 10,989,034 B2 | 4/2021 | Lin et al. | |
| 11,008,506 B2 | 5/2021 | Nguyen et al. | |
| 11,008,845 B2 | 5/2021 | Singh et al. | |
| 11,015,437 B2 | 5/2021 | Zhang et al. | |
| 11,021,649 B2 | 6/2021 | Bai et al. | |
| 11,028,318 B2 | 6/2021 | Cannan et al. | |
| 11,078,409 B2 | 8/2021 | Allison | |
| 11,104,841 B2 | 8/2021 | Hill et al. | |
| 11,111,766 B2 | 9/2021 | Brannon et al. | |
| 11,124,696 B2 | 9/2021 | Khamatnurova et al. | |
| 11,125,068 B2 | 9/2021 | Jiang et al. | |
| 11,142,680 B2 | 10/2021 | Dreyer et al. | |
| 11,155,751 B2 | 10/2021 | Bestaoui-Spurr et al. | |
| 11,162,022 B2 | 11/2021 | Cannan et al. | |
| 11,162,347 B2 | 11/2021 | Yu et al. | |
| 11,180,691 B2 | 11/2021 | Sodhi et al. | |
| 11,230,660 B2 | 1/2022 | Nguyen et al. | |
| 11,236,599 B2 | 2/2022 | Nguyen et al. | |
| 11,254,857 B2 | 2/2022 | Cox et al. | |
| 11,255,176 B2 | 2/2022 | Nguyen et al. | |
| 11,274,243 B2 | 3/2022 | Siddiqui et al. | |
| 11,280,172 B2 | 3/2022 | Peng et al. | |
| 11,313,211 B2 | 4/2022 | Johnson | |
| 11,313,214 B2 | 4/2022 | Nguyen et al. | |
| 11,319,482 B2 | 5/2022 | Rahy et al. | |
| 11,326,088 B2 | 5/2022 | Todd | |
| 11,339,323 B2 | 5/2022 | Roper et al. | |
| 11,345,848 B2 | 5/2022 | Khamatnurova et al. | |
| 11,352,551 B2 | 6/2022 | Agrawal et al. | |
| 11,365,341 B2 | 6/2022 | Patil et al. | |
| 11,377,581 B2 | 7/2022 | Belakshe et al. | |
| 11,377,944 B2 | 7/2022 | Santra et al. | |
| 11,396,800 B2 | 7/2022 | Madasu et al. | |
| 11,407,932 B2 | 8/2022 | Deysarkar et al. | |
| 11,408,281 B2 | 8/2022 | Lu et al. | |
| 11,414,974 B2 | 8/2022 | Entchev et al. | |
| 11,427,753 B2 | 8/2022 | Ortega Andrade et al. | |
| 11,428,087 B2 | 8/2022 | Nguyen et al. | |
| 11,428,839 B2 | 8/2022 | Mukherjee | |
| 11,434,740 B1 * | 9/2022 | Ngyuen | E21B 43/26 |
| 11,441,406 B2 | 9/2022 | Nguyen et al. | |
| 11,447,690 B2 | 9/2022 | Nguyen et al. | |
| 11,447,693 B2 | 9/2022 | Jenkins et al. | |
| 11,459,500 B2 | 10/2022 | Khamatnurova et al. | |
| 11,465,155 B1 | 10/2022 | Mitchell et al. | |
| 11,466,201 B2 | 10/2022 | Smith, Jr. et al. | |
| 11,485,901 B2 | 11/2022 | Shen et al. | |
| 11,486,241 B2 | 11/2022 | Nelson et al. | |
| 11,492,543 B2 * | 11/2022 | Gordon | C09K 8/80 |
| 11,506,584 B2 | 11/2022 | Martysevich et al. | |
| 11,512,025 B2 | 11/2022 | Eldred et al. | |
| 11,535,588 B2 | 12/2022 | Favero et al. | |
| 11,536,125 B1 | 12/2022 | Yang et al. | |
| 11,560,776 B2 | 1/2023 | Madasu | |
| 11,566,488 B2 | 1/2023 | Brandl et al. | |
| 11,566,504 B2 | 1/2023 | Perez et al. | |
| 11,568,111 B2 | 1/2023 | Zhou et al. | |
| 11,578,262 B2 | 2/2023 | Gordon et al. | |
| 11,590,469 B2 | 2/2023 | Cho et al. | |
| 11,591,903 B2 | 2/2023 | Mukherjee | |
| 11,597,872 B2 | 3/2023 | Conkle | |
| 11,608,724 B2 | 3/2023 | Chopade et al. | |
| 11,608,740 B2 | 3/2023 | Moos et al. | |
| 11,613,691 B1 | 3/2023 | Pollock | |
| 11,613,989 B2 | 3/2023 | Zhang et al. | |
| 11,629,284 B1 | 4/2023 | Saini et al. | |
| 11,629,581 B2 | 4/2023 | Cook | |
| 11,643,592 B1 | 5/2023 | Saini et al. | |
| 11,649,398 B1 | 5/2023 | AlTammar et al. | |
| 11,656,002 B2 | 5/2023 | Nevison et al. | |
| 11,661,842 B2 | 5/2023 | Dalamarinis et al. | |
| 11,667,831 B2 | 6/2023 | Liang et al. | |
| 11,667,832 B2 | 6/2023 | Saini et al. | |
| 11,674,074 B2 | 6/2023 | Sherman | |
| 11,692,127 B2 | 7/2023 | Dawson et al. | |
| 11,692,424 B2 | 7/2023 | Nguyen et al. | |
| 11,697,759 B1 | 7/2023 | Dusterhoft et al. | |
| 11,697,760 B2 | 7/2023 | Stover et al. | |
| 11,702,587 B2 | 7/2023 | Li et al. | |
| 11,702,588 B1 | 7/2023 | Saini et al. | |
| 11,713,414 B1 | 8/2023 | Dobson et al. | |
| 11,732,179 B2 | 8/2023 | Vidma et al. | |
| 11,753,584 B2 | 9/2023 | Mazrooee et al. | |
| 11,753,919 B2 | 9/2023 | Velikanov et al. | |
| 11,753,923 B2 | 9/2023 | Dalamarinis | |
| 11,767,466 B2 | 9/2023 | Santra et al. | |
| 11,781,062 B1 | 10/2023 | Liu et al. | |
| 11,781,412 B2 | 10/2023 | Zhang et al. | |
| 11,814,923 B2 | 11/2023 | Sherman et al. | |
| 11,827,845 B2 | 11/2023 | Vigderman et al. | |
| 11,840,911 B2 | 12/2023 | Fan et al. | |
| 11,845,895 B2 | 12/2023 | Montalvo et al. | |
| 11,859,129 B2 | 1/2024 | Uddenburg et al. | |
| 11,859,489 B2 | 1/2024 | Werry et al. | |
| 11,876,398 B1 | 1/2024 | Heath et al. | |
| 11,965,677 B2 | 4/2024 | Cook et al. | |
| 12,037,894 B2 | 7/2024 | Zhang et al. | |
| 2001/0001308 A1 | 5/2001 | Varadaraj et al. | |
| 2004/0014824 A1 | 1/2004 | Leinweber et al. | |
| 2004/0040708 A1 | 3/2004 | Stephenson et al. | |
| 2005/0244641 A1 | 11/2005 | Vincent | |
| 2005/0274523 A1 | 12/2005 | Brannon et al. | |
| 2006/0073980 A1 | 4/2006 | Brannon et al. | |
| 2006/0175059 A1 | 8/2006 | Sinclair et al. | |
| 2006/0272816 A1 | 12/2006 | Willberg et al. | |
| 2008/0135246 A1 | 6/2008 | Canova et al. | |
| 2008/0156489 A1 | 7/2008 | Pershikova et al. | |
| 2009/0038797 A1 | 2/2009 | Skala et al. | |
| 2009/0038799 A1 | 2/2009 | Garcia-Lopez de Victoria et al. | |
| 2009/0075847 A1 | 3/2009 | Wawrzos et al. | |
| 2009/0283447 A1 | 11/2009 | D'Elia et al. | |
| 2010/0179077 A1 | 7/2010 | Turakhia et al. | |
| 2010/0263865 A1 | 10/2010 | Willberg et al. | |
| 2011/0082033 A1 | 4/2011 | Frohs et al. | |
| 2011/0111990 A1 | 5/2011 | Pershikova et al. | |
| 2011/0118155 A1 | 5/2011 | Pisklak et al. | |
| 2012/0043080 A1 | 2/2012 | Edwards | |
| 2012/0088699 A1 | 4/2012 | Qin | |
| 2012/0241168 A1 | 9/2012 | Pei et al. | |
| 2012/0267102 A1 | 10/2012 | Huang et al. | |
| 2013/0025867 A1 | 1/2013 | Sun et al. | |
| 2014/0014338 A1 | 1/2014 | Crews et al. | |
| 2014/0096952 A1 * | 4/2014 | Hocking | E21B 43/267 |
| | | | 166/248 |
| 2014/0196898 A1 | 7/2014 | Tanguay et al. | |
| 2014/0209390 A1 | 7/2014 | Jamison et al. | |
| 2014/0353042 A1 | 12/2014 | Karale et al. | |
| 2015/0167437 A1 | 6/2015 | Dawson | |
| 2015/0211346 A1 | 7/2015 | Potapenko et al. | |
| 2015/0233226 A1 | 8/2015 | Holzhauser et al. | |
| 2015/0247084 A1 | 9/2015 | Epstein | |
| 2015/0292279 A1 | 10/2015 | Wang | |
| 2015/0361331 A1 | 12/2015 | Tanguay et al. | |
| 2016/0137910 A1 | 5/2016 | Chang et al. | |
| 2016/0215205 A1 | 7/2016 | Nguyen et al. | |
| 2016/0319185 A1 | 11/2016 | Semenov et al. | |
| 2016/0326300 A1 | 11/2016 | Gelves et al. | |
| 2016/0340573 A1 | 11/2016 | Semenov et al. | |
| 2017/0145302 A1 | 5/2017 | Qin et al. | |
| 2017/0198209 A1 | 7/2017 | Stephenson et al. | |
| 2017/0321105 A1 | 11/2017 | McDaniel et al. | |
| 2018/0066179 A1 | 3/2018 | Nguyen et al. | |
| 2018/0282222 A1 | 10/2018 | Khan | |
| 2018/0339946 A1 | 11/2018 | Öttinger et al. | |
| 2019/0016944 A1 | 1/2019 | Eldred et al. | |
| 2019/0048146 A1 | 2/2019 | Dei Santi et al. | |
| 2019/0112520 A1 | 4/2019 | Knoer et al. | |
| 2019/0241789 A1 | 8/2019 | Agapiou et al. | |
| 2019/0330520 A1 | 10/2019 | Cannan et al. | |
| 2020/0131431 A1 | 4/2020 | Russum | |

(56) References Cited

U.S. PATENT DOCUMENTS

| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1* | 5/2021 | Wang .................... E21B 49/006 |
| 2021/0207465 A1 | 7/2021 | Nguyen et al. |
| 2021/0229049 A1 | 7/2021 | Mazrooee et al. |
| 2021/0246364 A1* | 8/2021 | Gordon ................. E21B 43/267 |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1* | 5/2023 | Decker .................. C09K 8/805 507/219 |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |

FOREIGN PATENT DOCUMENTS

| CN | 203319922 U | 12/2013 | |
| CN | 109236262 A | 8/2020 | |
| CN | 109751029 B | 10/2021 | |
| PL | 234113 B1 | 3/2018 | |
| PL | 234114 B1 | 11/2018 | |
| WO | 2007141519 A2 | 12/2007 | |
| WO | 2008033225 A2 | 3/2008 | |
| WO | 2011163529 A1 | 12/2011 | |
| WO | 2012040025 A2 | 3/2012 | |
| WO | 2012051026 A2 | 4/2012 | |
| WO | 2012104582 A1 | 8/2012 | |
| WO | 2013059793 A2 | 4/2013 | |
| WO | 2013119507 A1 | 8/2013 | |
| WO | 2013158308 A1 | 10/2013 | |
| WO | 2013176977 A1 | 11/2013 | |
| WO | 2014039968 A1 | 3/2014 | |
| WO | 2014172953 A1 | 10/2014 | |
| WO | 2014172955 A1 | 10/2014 | |
| WO | 2015021523 A1 | 2/2015 | |
| WO | 2015031415 A2 | 3/2015 | |
| WO | 2015041690 A1 | 3/2015 | |
| WO | 2016033533 A1 | 3/2016 | |
| WO | 2016054022 A1 | 4/2016 | |
| WO | 2016074075 A1 | 5/2016 | |
| WO | 2016168719 A1 | 10/2016 | |
| WO | 2018001748 A1 | 1/2018 | |
| WO | 2018094123 A1 | 5/2018 | |
| WO | 2019164694 A1 | 8/2019 | |
| WO | 2019199431 A1 | 10/2019 | |
| WO | 2019/222034 A1 | 11/2019 | |
| WO | 2020131122 A1 | 6/2020 | |
| WO | 2020139472 A1 | 7/2020 | |
| WO | 2020185373 A1 | 9/2020 | |
| WO | 2021030287 A1 | 2/2021 | |
| WO | 2022232715 A1 | 11/2022 | |
| WO | WO-2022241338 A1 * | 11/2022 | .............. C09K 8/68 |
| WO | WO-2022241339 A1 * | 11/2022 | .............. C09K 8/62 |
| WO | 2023040535 A1 | 3/2023 | |
| WO | 2024131192 A1 | 6/2024 | |

OTHER PUBLICATIONS

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

(56)                References Cited

OTHER PUBLICATIONS

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)-Coke Composites Prepared by Mechanical Alloying Technique", XP055926292, DOI: 10.20944/preprints201608.0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating To Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

* cited by examiner

HYDRAULIC FRACTURING METHODS UTILIZING FRACTURING FLUIDS COMPRISING COKE PROPPANT PARTICLES AND LOW-BASE-VISCOSITY CARRIER FLUID

CROSS-REFERENCE TO RELATED APPLICATION

This application claims priority to and the benefit of co-pending and commonly-assigned U.S. patent application Ser. No. 18/417,433, filed Jan. 19, 2024, titled "HYDRAULIC FRACTURING FLUID COMPRISING MICRO-PROPPANT COKE PARTICLES, METHOD FOR MAKING SAME, AND HYDRAULIC FRACTURING PROCESSES USING SAME," co-pending and commonly-assigned U.S. patent application Ser. No. 18/417,478, filed Jan. 19, 2024, titled "METHODS FOR PERFORMING REFRACTURING OPERATIONS USING COKE PROPPANT PARTICLES," co-pending and commonly-assigned U.S. patent application Ser. No. 18/417,492, filed Jan. 19, 2024, titled "PROPPANT PARTICLES FORMED FROM FLUID COKE AND FLEXICOKE, FRACTURING FLUIDS COMPRISING SUCH PROPPANT PARTICLES, AND METHODS RELATED THERETO," co-pending and commonly-assigned U.S. patent application Ser. No. 18/417,488, filed Jan. 19, 2024, titled "HYDRAULIC FRACTURING METHODS UTILIZING COKE PROPPANT PARTICLES," and co-pending and commonly-assigned U.S. patent application Ser. No. 18/417,483, filed Jan. 19, 2024, titled "METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING," the contents of all of which are incorporated by reference herein in their entirety.

FIELD

This disclosure relates generally to the field of hydraulic fracturing operations and the fracturing fluids and proppant particles employed therein. More specifically, this disclosure relates to hydraulic fracturing methods utilizing fracturing fluids comprising coke proppant particles and a low-base-viscosity carrier fluid. The methods are useful in, e.g., unconventional production of hydrocarbon products from subterranean formations.

BACKGROUND

This section is intended to introduce various aspects of the art, which may be associated with aspects and embodiments of the present disclosure. This discussion is believed to assist in providing a framework to facilitate a better understanding of particular aspects and embodiments of the present disclosure. Accordingly, it should be understood that this section should be read in this light, and not necessarily as admissions of prior art.

A wellbore can be drilled into a subterranean formation to promote the removal (or production) of a desired resource, such as hydrocarbons, coal, minerals, water, and the like. In many cases, the subterranean formation needs to be stimulated in some manner to promote the removal of the resource. Stimulation can include any operation performed upon the matrix of a subterranean formation to improve fluid conductivity therethrough, including hydraulic fracturing, which is a commonly used for unconventional reservoirs.

Hydraulic fracturing typically involves the pumping of large quantities of fracturing fluid into a subterranean formation (e.g., a low-permeability formation) under high hydraulic pressure to promote the formation of one or more fractures within the matrix of the formation and to create high-conductivity flow paths. Primary fractures extending from the wellbore and, in some instances, secondary fractures extending from the primary fractures are formed during a fracturing operation. These fractures may be vertical, horizontal, or a combination of directions forming a tortuous path.

Proppant particles are often included in the fracturing fluid along with a carrier fluid. Once the fracturing fluid has been pumped into the subterranean formation, it is desired that such proppant particles could be transported into the fractures and settle therein. Upon pressure release, the proppant particles remaining in the fractures keep the fractures open by preventing them from collapsing, facilitating the flow of the desired resource from the fractured formation into the wellbore through the propped fractures. The performance of the proppant can affect the recovery of the intended resource significantly.

Sand has been traditionally used as a proppant in hydraulic fracturing for the production of hydrocarbon fluids from unconventional wells. Various other types of proppants and carrier fluids have been proposed and available to substitute sand. Nonetheless, all these existing proppants suffer from one of more drawbacks such as high cost and limited hydrocarbon recovery rate. Thus, there is a genuine need of high-performance proppants, hydraulic fracturing fluids, and hydraulic fracturing methods in the industry. This disclosure satisfies these and other needs.

SUMMARY

We have found that a fracturing fluid comprising coke proppant particles and a carrier fluid having a low viscosity are particularly advantageous in fracturing subterranean formations, e.g., in unconventional hydrocarbon producing methods. The low-base-viscosity carrier fluid can effectively transport the coke proppant particles into distant primary and secondary fractures, resulting in higher product recovery rate compared to fracturing processes using fracturing fluids comprising low-base-viscosity carrier fluid and conventional proppant particles such as sand, or fracturing fluids comprising slick water carrier fluid and conventional proppant particles such as sand.

Thus, a first aspect of the present disclosure provides a method that can include hydraulically fracturing a subterranean formation by introducing a fracturing fluid comprising coke proppant particles and a carrier fluid into the subterranean formation. The carrier fluid can have a base viscosity of at most 0.8 centipoise (cP) at 25 degrees Celsius (° C.). The carrier fluid can include but is not limited to carbon dioxide ($CO_2$), natural gas (NG) (e.g., uncompressed natural gas, compressed natural gas (CNG)), liquified natural gas (LNG)), liquefied petroleum gas (LPG), nitrogen ($N_2$) (e.g., nitrogen gas, liquefied nitrogen ($LN_2$)), natural gas liquids (NGLs) (e.g., Y-grade NGL), single light hydrocarbons (e.g., methane, ethane, propane, butane, isobutane, pentane, and/or hexane), mixtures of C4 hydrocarbons, mixtures of C5 hydrocarbons, mixtures of C6 hydrocarbons, and any combination or mixture of two or more thereof. Moreover, the carrier fluid can include an energized carrier fluid. The coke proppant particles can include but are not limited to fluid coke, flexicoke, delayed coke, thermally post-treated coke, pyrolysis coke, coal-derived coke, and any combination or mixture of two or more thereof. The coke proppant particles (or a portion thereof) can be provided as microproppant coke particles.

Another aspect of the present disclosure provides a hydrocarbon well that can include a wellbore that extends within a subterranean formation, a production casing string that extends within the wellbore, perforation clusters formed within the production casing string, hydraulic fractures formed in the subterranean formation proximate to the perforation clusters, and a fracturing fluid comprising coke proppant particles and a carrier fluid within at least a portion of the hydraulic fractures. The carrier fluid has a base viscosity of at most 0.8 cP at 25° C. The carrier fluid can include but is not limited to $CO_2$, NG (e.g., uncompressed natural gas, CNG), LNG), LPG, $N_2$ (e.g., nitrogen gas, $LN_2$), NGLs (e.g., Y-grade NGL), single light hydrocarbons (e.g., methane, ethane, propane, butane, isobutane, pentane, and/or hexane), mixtures of C4 hydrocarbons, mixtures of C5 hydrocarbons, mixtures of C6 hydrocarbons, and any combination or mixture of two or more thereof. Moreover, the carrier fluid can include an energized carrier fluid. The coke proppant particles can include but are not limited to fluid coke, flexicoke, delayed coke, thermally post-treated coke, pyrolysis coke, coal-derived coke, and any combination or mixture of two or more thereof. The coke proppant particles (or a portion thereof) can be provided as microproppant coke particles.

Another aspect of the present disclosure provides a method that can include providing a carrier fluid having a viscosity of at most 0.8 cP at 25° C. and forming a fracturing fluid comprising the carrier fluid and coke proppant particles. The carrier fluid can include but is not limited to $CO_2$, NG (e.g., uncompressed natural gas, CNG), LNG), LPG, $N_2$ (e.g., nitrogen gas, $LN_2$), NGLs (e.g., Y-grade NGL), single light hydrocarbons (e.g., methane, ethane, propane, butane, isobutane, pentane, and/or hexane), mixtures of C4 hydrocarbons, mixtures of C5 hydrocarbons, mixtures of C6 hydrocarbons, and any combination or mixture of two or more thereof. Moreover, the carrier fluid can include an energized carrier fluid. The coke proppant particles can include but are not limited to fluid coke, flexicoke, delayed coke, thermally post-treated coke, pyrolysis coke, coal-derived coke, and any combination or mixture of two or more thereof. The coke proppant particles (or a portion thereof) can be provided as microproppant coke particles.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where.

Figure 1:
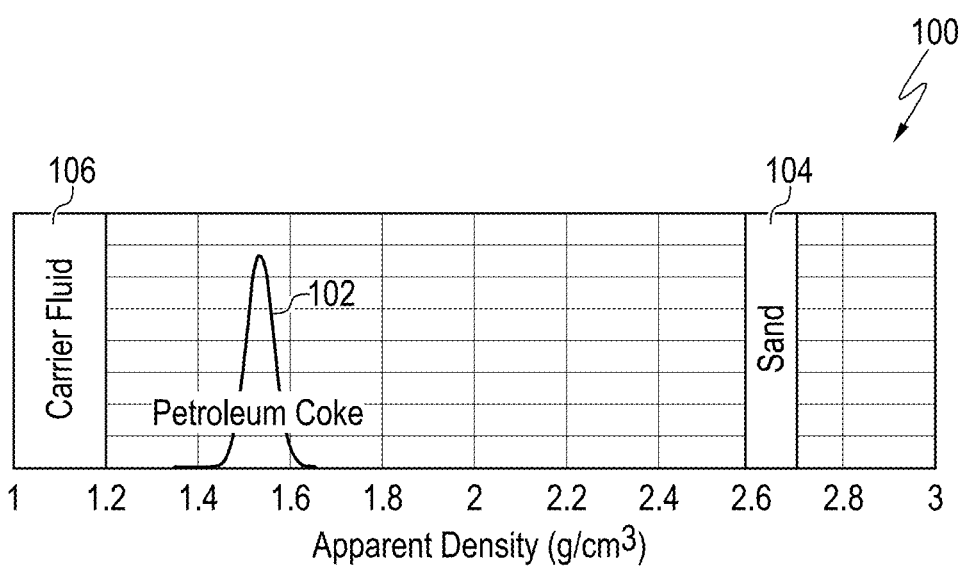
FIG. 1 is a graph comparing the apparent densities of petroleum coke particles within a petroleum coke sample to the apparent densities of sand particles within a sand sample.

It should be noted that the figures are merely examples of the present disclosure and are not intended to impose limitations on the scope of the present disclosure. Further, the figures are generally not drawn to scale, but are drafted for purposes of convenience and clarity in illustrating various aspects of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particles, refers to the density of the individual particles themselves, which may be expressed in grams per cubic centimeter ($g/cm^3$ or g/cc). The apparent density values provided herein are determined pursuant to the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

As used herein, the term "aqueous carrier fluid" refers to a fluid composed primarily of water that is used to transport material within and out of the wellbore. Examples include fresh water, brine, slickwater, and water-based viscosified fluid.

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "blast furnace coke" refers to any coal-derived coke suitable for use in a blast furnace for making steel.

As used herein, the term "crush strength," when used with reference to proppant particles, refers to the uniaxial stress (compressive) load that the proppant particles can withstand prior to crushing (e.g., breaking or cracking). The crush strength values of the present disclosure are determined pursuant to API RP-19C.

As used herein, the term "delayed coke" refers to the solid concentrated carbon material that is produced within delayed coking units via the delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which can have an outlet temperature of, e.g., around 895° F. to around 960° F. The heated feedstock then enters a reactor, often referred to as a "coke drum," which can operate at temperatures of, e.g., around 780° F. to around 840° F. Within the coke drum, the cracking reactions continue. The resulting cracked products then exit the coke drum as an overhead stream, while coke deposits in the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are used. While one coke drum is on-line filling with coke, another coke drum can be steam-stripped, cooled, decoked (e.g., via hydraulically cutting the deposited coke with water), pressure-checked, and warmed up.

Moreover, the overhead stream exiting the coke drum enters the fractionator, where naphtha and heating oil fractions are recovered. The heavy recycle material is then typically combined with preheated fresh feedstock and recycled back into the process.

As used herein, the term "energized carrier fluid" refers to a carrier fluid that includes a compressible fluid (e.g., typically a gas at standard conditions) that will expand significantly when pressure is reduced. Moreover, as used herein, the term "energized carrier fluid" is intended to be inclusive of energized foams as well as standard energized fluids.

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOKING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically in a range from around 496° C. to around 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOKING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOKING™ process that produces the Flexicoke in that the fluid coking process does not include a gasifier.

The term "fluid" refers to gases, liquids, and combinations of gases and liquids, as well as to combinations of gases and solids, combinations of liquids and solids, and combinations of gas, liquid, and solids. For example, a fracturing fluid or a carrier fluid can be a gas, a liquid, a gas/liquid mixture, a gas/solid mixture, a liquid/solid mixture, or a gas/liquid/solid mixture. Proppant particles can be present in the form of solid particulates in a fracturing fluid comprising a carrier fluid and other additives.

As used herein, the term "fly ash" refers to fine particles of ash, dust, and soot that generally consist primarily of silicon dioxide, aluminum oxide, and calcium oxide and are produced as a byproduct of the combustion of pulverized coal, typically within coal-fired electric and steam-generating plants.

The term "fracture" (or "hydraulic fracture") refers to a crack or surface of breakage within a subterranean formation, that can be induced by an applied pressure or stress.

As used herein, the term "hydraulic conductivity" refers to the ability of a fluid within a subterranean formation to pass through a fracture including proppant at various stress (or pressure) levels, which is based, at least in part, on the permeability of the proppant deposited within the hydraulic fractures. The hydraulic conductivity values provided herein are determined pursuant to the American Petroleum Institute's Recommended Practice 19D (API RP-19D) standard, entitled "Measuring the Long-Term Conductivity of Proppants" (First Ed. May 2008, Reaffirmed May 2015).

As used herein, the term "metallurgical coke" refers to a type of coal-derived coke that is produced by heating coal, which causes fixed carbon to fuse to inherent ash and drives off a large percentage of the volatile matter. The resulting metallurgical coke particles include a range of different sizes, with the smallest particles being a fine powder (sometimes referred to as "coke breeze").

The term "particle size(s)," when used herein with reference to a type of particles," refers to the diameter(s) of such particle(s). The term "D50" means the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are at least three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

The term "coal-derived coke" means any coke prepared from coal by, e.g., thermal treatment.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350; 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "non-coke proppant" means any proppant that does not comprise coke proppant particles. Examples of non-coke proppant include sand, ceramic proppants, glass proppants, and polymer proppants.

The term "lightweight proppant (LWP)" refers to proppants having an apparent density within a range of from around 1.2 g/cm³ to around 2.2 g/cm³ (e.g., from around 1.2, 1.3, 1.4, 1.5, 1.6 g/cm³ to around 1.7, 1.8, 1.9, 2.0, 2.1, 2.2 g/cm³), while the term "ultra-lightweight proppant (ULWP)" refers to proppants having an apparent density within a range from around 0.5 g/cm³ to around 1.2 g/cm³ (e.g., from around 0.5, 0.6, 0.7, 0.8 g/cm³ to around 0.9, 1.0, 1.1, 1.2 g/cm³). A coke proppant may or may not be an LWP. The term "non-LWP proppant" refers to proppants having apparent density higher than 2.2 g/cm³ (e.g., from around 2.3, 2.4, 2.5 to around 2.6, 2.8, 3.0, to 3.2, 3.4, 3.5 g/cm³.) A non-coke proppant may or may not be a non-LWP.

The term "microproppant" means proppant particles having particle sizes of at most 105 μm (140 mesh). The term "microproppant coke particles" means a collection of coke particles having particle sizes of at most 105 μm, but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

The term "petroleum coke proppant particles" means a collection of coke proppant particles that are derived from a petroleum coke source material. The term "petroleum coke fines" means a collection of microproppant coke particles that are derived from a petroleum source material.

As used herein, the term "pyrolysis coke" refers to a type of coke that is generated via hydrocarbon pyrolysis at pyrolysis temperatures higher than the coking processes for making petroleum coke.

As used herein, the term "light hydrocarbon" refers to hydrocarbons with a molar mass less than about 100 g/mol. This class of compounds includes methane, ethane, propane, butane, isobutane, pentane, and hexane.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

As used herein, the term "thermally post-treated coke" refers to petroleum coke that has been heated to temperatures in a range from around 400° C. to 1200° C. (e.g., from around 400, 500, 600° C., to 700, 800, 900° C., to 1000, 1100, 1200° C.) for a predetermined duration that is in a range from around 1 minute to around 24 hours (e.g., from around 1 minute, 30 minutes, 1 hour, to 4 hours, 8 hours, 12 hours, to 16 hours, 20 hours, 24 hours).

The term "viscosity" as used herein refers to the dynamic viscosity of a fluid, while the term "base viscosity" as used herein refers to the dynamic viscosity of a fluid before any viscosity modifiers are added to the fluid. As an example, water has a base viscosity of 0.89 cP (centipoise) at 25° C. Typically viscosity of a fracturing fluid or a carrier fluid is measured with a rotational viscometer, with shear rate in the range from 0 to 511 s⁻¹. Values of viscosity used herein refer to viscosities measured at room temperature (about 25° C.).

The term "low-base-viscosity carrier fluid" means a carrier fluid having a base viscosity of no greater than 0.8 cP at 25° C. The term "low-viscosity fracturing fluid" means a fracturing fluid having a viscosity at 25° C. no greater than 50 cP. A preferred fracturing fluid of this disclosure is a low-viscosity fracturing fluid. The viscosity of a fracturing fluid is measured with respect to the remainder portion thereof without the presence of the proppant particles, if any. Thus, if a fracturing fluid does not comprise any proppant, then the viscosity of the fracturing fluid is measured of itself. If a fracturing fluid comprises proppant particles, a carrier fluid, and other components such as viscosifying agents, then the viscosity of the fracturing fluid is measured of the remainder of the fracturing fluid without the presence of the proppant particles.

The term "viscosifying agent" or "viscosifier" interchangeably means a material, if added and dispersed into a fluid, increases the viscosity of the resultant mixture. Non-limiting examples of viscosifying agents useful for fracturing fluids include clay, polymers, and bio-polymers.

The term "wellbore" refers to a borehole drilled into a subterranean formation. The borehole may include vertical, deviated, highly deviated, and/or lateral sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about", "around," or "approximately" the indicated value, and account for experimental errors and variations that would be expected by a person having ordinary skill in the art.

During the drilling of a hydrocarbon well, a wellbore is formed within a subterranean formation using a drill bit that may be advanced at the lower end of a drill string until it reaches a predetermined location in the subsurface. The drill string and bit may then be removed, and the wellbore may be lined with steel tubulars, commonly referred to as casing strings. An annulus may thus be formed between the casing strings and the surrounding subterranean formation. A cementing operation may be conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string may be cemented entirely back to the surface.

A process of drilling and then cementing progressively-smaller casing strings may be repeated several times below the surface casing string until the hydrocarbon well has reached total depth. The final casing string, referred to as the "production casing string," may extend through a hydrocarbon-bearing interval (referred to as a "reservoir") in the subterranean formation. In some instances, the production casing string is a production liner, i.e., a casing string that is not tied back to the surface. The production casing string may also be cemented into place. In some completions, the production casing string has swell packers or plugs spaced across selected productive intervals. This creates compartments between the packers for isolation of stages and specific stimulation treatments. In this instance, the annulus may simply be packed with sand.

As part of the completion process, a section of the wellbore (referred to as a "stage") may be isolated through the setting of a packer or plug. The production casing string may then be perforated at one or more desired intervals uphole of the plug, meaning that clusters of perforations are created through the production casing string and the cement column surrounding the production casing string using a perforating gun. In operation, the perforating gun may form one perforation cluster by shooting a number of perforations in close proximity, such as, for example, 12 to 18 perforations at one time, over a 1 foot (ft) (0.3 meter (m)) to 3 ft (0.9 m) region, for example, with each perforation potentially being approximately 0.3 inches (in) (0.8 centimeters (cm))

to 0.5 in (1.3 cm) in diameter, for example. The perforating gun may then be moved uphole around 10 ft (3 m) to 100 ft (30 m), for example, and a second perforating gun may be used to form a second perforation cluster. This process of forming perforation clusters may be repeated to create additional perforation clusters within each stage of the hydrocarbon well. The resulting perforation clusters may allow hydrocarbon fluids from the surrounding subterranean formation to flow into the hydrocarbon well. Note that in some instances, however, the production casing string is instead provided as a sliding sleeve tubular or other type of casing string with pre-formed perforation clusters. In such instances, the preformed perforations may be initially closed but can be opened through various forms of actuation to control fluid flow through the perforations.

After the perforation process is complete, the subterranean formation may be hydraulically fractured at each stage of the wellbore to increase the productivity of the subterranean formation. Hydraulic fracturing consists of injecting a volume of fracturing fluid through the created perforations and into the surrounding subterranean formation at such high pressures and rates that the subsurface rock in proximity to the perforations cracks open and resulting hydraulic fractures extend outwardly into the subterranean formation in proportion to the injected fluid volume. Ideally, a separate hydraulic fracture emanates outwardly from each perforation cluster, forming a set of hydraulic fractures, commonly referred to as a "fracture network." Ideally, this fracture network includes a sequence of parallel fracture planes, thereby creating as much fracturing of the subsurface rock as possible. Near the wellbore, a complex topology of hydraulic fractures may sometimes result from the breakdown of perforations within each perforation cluster, but it is common to assume that these hydraulic fractures ultimately link up to form a single dominant fracture plane that is hydraulically connected to the wellbore. In operation, to create the hydraulic fracture, the injection pressure of the fracturing fluid must exceed the hydraulic pressure in the subterranean formation plus the strength of the rock, and often even exceeds the lithostatic pressure in the subterranean formation.

Hydraulic fracturing is used most extensively for increasing the productivity of "unconventional" (or "tight") subterranean formations, which are subterranean formations with very low permeability that typically do not produce economically without hydraulic fracturing. Examples of unconventional subterranean formations include tight sandstone formations, tight carbonate formations, shale gas formations, coal bed methane formations, and tight oil formations. During the hydraulic fracturing of such subterranean formations, the pump rate (or injection rate) of the fracturing fluid may be increased until it reaches a maximum pump rate of around 20 barrels per minute (bbl/min) to around 150 bbl/min (e.g., 20, 60, 90 bbl/min, to 120, 150 bbl/min). In operation, around 5,000 barrels to around 15,000 barrels (e.g., 5,000, 6,000, 7,000, 8,000 barrels, to 9,000, 10,000, 11,000, 12,000 barrels, to 13,000, 14,000, 15,000 barrels) of fracturing fluid may be injected for each stage of the hydrocarbon well, for example.

In operation, a small portion (e.g., often around 5% to around 10%) of the fracturing fluid may be pumped into the wellbore during a pad phase of the hydraulic fracturing operation for each stage. The pad phase is designed to initiate hydraulic fractures and grow the hydraulic fractures to a certain size and volume to accommodate the injection of a proppant in a subsequent slurry phase. The remaining portion of the fracturing fluid may then be mixed with the proppant and pumped into the wellbore and through the perforations into the stimulated reservoir volume (SRV) in the slurry phase. The proppant serves to hold the hydraulic fractures open after the hydraulic pressure is released. Ideally, the resulting hydraulic fractures grow to be hundreds of feet radially from the wellbore into the subterranean formation. In the case of unconventional subterranean formations, the combination of hydraulic fractures and injected proppant substantially increases the flow capacity of the treated formation.

The subterranean formations may represent hundreds of feet of gross, vertical thickness. More recently, hydrocarbon wells are being completed through formations laterally, with the lateral sections often extending at least 1,000 feet (304 meters), in which case the hydrocarbon well may be referred to as an "extended-reach lateral well," or, in some cases, at least 10,000 feet (3048 meters), in which case the hydrocarbon well may be referred to as an "ultra-extended-reach lateral well."

When there are multiple-layered or very thick formations to be hydraulically fractured, or where an extended-reach or ultra-extended-reach lateral well is being completed, then more complex treatment techniques may be utilized to obtain treatment of the entire target area. Therefore, the operating company may isolate the various stages (as described above) to ensure that each separate stage is not only perforated, but also adequately fractured and treated. In this way, the operator may be sure that fracturing fluid is being injected through each perforation cluster and into each stage of interest to effectively increase the flow capacity at each desired depth and lateral location.

Treatment of a stage of interest may involve isolating the stage from all stages that have already been treated. This may involve the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process may be repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there may be around 20 to around 50 individual stages, for example. For ultra-extended-reach lateral wells, there may be more than 100 stages, for example.

After the hydraulic fracturing process is complete, the frac plugs (and/or other diversion materials) may be drilled out of the hydrocarbon well. The hydrocarbon well may then be brought on production, meaning that it may be used to recover hydrocarbon fluids from the subterranean formation. In operation, the pressure differential between the formation and the hydrocarbon well may be used to force hydrocarbon fluids to flow through the hydraulic fractures within the formation and into the production casing string via the corresponding perforation clusters. The hydrocarbon fluids then flow up the hydrocarbon well to the surface.

In operation, the success of the hydraulic fracturing process has a direct impact on the ultimate production performance of the hydrocarbon well. Specifically, the numbers, sizes, compliances, and locations of the hydraulic fractures corresponding to the perforation clusters within each stage of the hydrocarbon well directly impact the amount of hydrocarbon fluids that are able to mobilize and flow into the hydrocarbon well. However, the success of the hydraulic fracturing process is limited by the ability of the fracturing fluid to penetrate deeply into the subterranean formation. In particular, non-coke proppants, such as sand, have limited ability to penetrate deeply into the subterranean formation and instead have a tendency to settle within near-wellbore regions of the subterranean formation. This is due, in part, to the tendency of non-coke proppants to settle quickly within typical carrier fluids, such as slickwater. Often thick gels, such as cross-linked guar gels are added to the fracturing fluid to dramatically increase the fluid viscosity and permit more effective proppant transport. However, these high-viscosity gels (e.g., with a viscosity of greater than 100 cP at 25° C.) have been considered to be severely damaging to the permeability of the fracture and associated reservoir matrix, so slickwater fluids have become more commonly used in ultra-tight rock fracturing. More specifically, slickwater is a type of carrier fluid that is composed of water with various additives in low concentrations, including, in particular, friction reducers (e.g., polyacrylamides). Slickwater has a base viscosity of greater than 0.8 cP and typically less than 100 cP at 25° C. A fracturing fluid comprising slick water as the carrier fluid and additional viscosifying agent can have a viscosity greater than 100 cP.

The viscosity of the carrier fluid is a key parameter in hydraulic fracturing operations. Specifically, the viscosity of the carrier fluid determines, at least in part, the ability of the proppant to effectively transport into the subterranean formation and, therefore, impacts the created fracture geometries (e.g., fracture lengths and heights). In general, for a given viscosity of the carrier fluid, there is a minimum fracturing fluid flow rate for maintaining a minimum fluid velocity for suspension of the proppant within the fracturing fluid. When the fracturing fluid flow rate falls below that minimum, the proppant will settle out and deposit within the subterranean formation. For this reason, the viscosity of the carrier fluid is often increased by adding viscosifying agents (e.g., gels and/or high-viscosity, high-concentration friction reducers). However, while the addition of such viscosifying agents somewhat enhances the ability of non-coke proppants to remain suspended within the fracturing fluid, such viscosifying agents are costly and may cause formation damage. In particular, viscosifying agents may decrease the permeability around the fracture faces, plug the pore spaces, and/or alter the wettability conditions within the formation (among other potential damaging effects).

Therefore, the present disclosure alleviates the foregoing difficulty and provides related advantages as well. Specifically, the present disclosure provides for the hydraulic fracturing of subterranean formations using fracturing fluids, preferably low-viscosity fracturing fluids, comprising a low-base-viscosity carrier fluid. Such carrier fluids may include but are not limited to $CO_2$ (e.g., gas $CO_2$, liquified $CO_2$, super critical $CO_2$), CNG, NG, LNG, LPG, $LN_2$, $N_2$, NGLs, single light hydrocarbons, C4 hydrocarbon mixtures (e.g., butanes), C5 hydrocarbon mixtures (e.g., pentanes), C6 hydrocarbon mixtures (e.g., hexanes), or any combination thereof. Moreover, according to the present disclosure, coke proppant particles are provided as at least a portion of the proppant particles within the fracturing fluid. As described further herein, such coke proppant particles are particularly well-suited to stay suspended within fracturing fluid comprising a low-base-viscosity carrier fluid without the presence of significant amount of viscosifying agent (or even in the absence of any viscosifying agent) in the fracturing fluid, thus enabling the subterranean formation to be effectively fractured without the utilization of high-viscosity fracturing fluids including substantial volumes of viscosifying agents (e.g., gels and/or high-viscosity, high-concentration friction reducers) that result in formation damage. In comparison, non-coke proppant particles, such as sand, are poorly-suited to stay suspended within such fracturing fluids due, at least in part, to the relatively higher densities and/or larger particle sizes of such proppants.

According to aspects and embodiments described herein, the utilization of a fracturing fluid, particularly a low-viscosity fracturing fluid, including a carrier fluid that has a base viscosity of at most 0.8 cP at 25° C. provides a number of advantages over conventional techniques utilizing relatively high-viscosity fracturing fluids comprising a carrier fluid having a relatively high base viscosity, especially those including one or more viscosifying agents (e.g., gels and/or with high-viscosity, high-concentration friction reducers). A low-base-viscosity carrier fluid promotes beneficial fluid imbibition into tight formations compared to carrier fluids with high base viscosity such as slick water, leading to enhanced hydrocarbon recovery. The use of a low-base-viscosity carrier fluid in the fracturing fluid can surprisingly reduce or even eliminate the use of viscosifying agent in the fracturing fluid, especially where coke proppant particles are used along with the low-base-viscosity carrier fluid. The utilization of a low-viscosity fracturing fluid with little to no added viscosifying agents both reduces the cost of the fracturing fluid and prevents formation damage that is typically caused by such viscosifying agents, as described above. Thus, preferably the fracturing fluid of this disclosure comprises viscosifying agents at a total concentration from 0 wt % to 0.001, 0.002, 0.005, 0.008, 0.01, wt %, to 0.02, 0.05, 0.08, 0.1, wt %, to 0.2, 0.3, 0.4, 0.5, wt %, to 0.6, 0.7, 0.8, 0.9, 1, wt %, to 2, 3, 4, 5, wt %, based on the total weight of the fracturing fluid. Preferably the fracturing fluid of this disclosure has a viscosity from 0.001, 0.002, 0.005, 0.008, 0.01, cP, to 0.02, 0.05, 0.08, 0.1, cP, to 0.2, 0.5, 0.8, 1, cP, to 2, 5, 8, 10, cP, to 20, 30, 40, 50, cP, measured at 25° C. As another example, the inclusion of a gas (in this case, meaning a fluid that is gaseous at ambient conditions) as at least a portion of the carrier fluid aids with the unloading of low-pressure reservoirs. For this reason, gas may be added to an aqueous carrier fluid (forming an energized carrier fluid) to aid with early flowback of low-pressure wells. As another example, the utilization of low-viscosity fracturing fluid may create beneficial and complementary fracture geometries in comparison to relatively high-viscosity fracturing fluids by creating fracture networks with increased complexity. As another example, the utilization of a carrier fluid with such a low viscosity may enable the fracturing fluid to penetrate deeply into the formation matrix, potentially mixing with the hydrocarbon fluids within the formation and causing such hydrocarbon fluids to more readily flow into the wellbore, as well as potentially lowering the oil viscosity within the formation and helping to sweep hydrocarbon fluids out of tight pore spaces, leading to enhanced hydrocarbon recovery.

As described above, low-base-viscosity carrier fluids are unable to effectively transport relatively high-density non-coke proppants (e.g., sand, with a specific gravity of 2.65) without the addition of viscosifying agents (e.g., gels and/or high-viscosity, high-concentration friction reducers) that increase the overall viscosity of the fracturing fluid. Surprisingly, coke proppant particles can be effectively transported by a low-base-viscosity carrier fluid into distant primary and second fractures, even if concentration of viscosifying agents in the fracturing fluid is low or zero (e.g., 0 wt % to 0.001, 0.002, 0.005, 0.008, 0.01, wt %, to 0.02, 0.05, 0.08, 0.1, wt %, to 0.2, 0.3, 0.4, 0.5, wt %, based on the total wright of the fracturing fluid). Without intending to be bound by a particular theory, we believe this is due to the following. First, the lower-density nature of coke enables coke proppant particles to stay suspended within the low-viscosity fracturing fluid and transport further within the wellbore and the corresponding hydraulic fractures as compared to non-coke proppant particles, as described further herein. In addition, we have found that coke proppant particles are less prone than non-coke proppant particles to flow back into the wellbore once the hydraulic fracturing operation is complete and the hydrocarbon well is brought on production. Moreover, we expect coke proppant particles are less prone than non-coke proppant particles to settle around the diversion materials within the wellbore, thus enabling dissolvable, biodegradable, or self-destructible diversion materials (such as dissolvable plugs, for example) to be effectively used within the wellbore.

Furthermore, the coke proppant particles reduce the likelihood of cluster-level screen-out as compared to the non-coke proppant particles. Each of these factors may advantageously reduce or eliminate the need to perform a wellbore cleanout procedure. Additionally, assuming that a wellbore cleanout procedure is still performed, the ability of coke proppant particles to remain suspended in the fracturing fluid for a longer period of time than non-coke proppants facilitates a faster, more efficient cleanout procedure.

As described herein, petroleum coke has sufficient crush strength to maintain propped fractures upon the removal of hydraulic pressure and to maintain efficient conductivity once the wellbore is brought on production. Furthermore, using petroleum coke may potentially reduce required injection pressures and avoid the need for frequent wellbore cleanouts.

Effective proppant particles are typically associated with a variety of particular characteristics or properties, including efficient proppant particle transport within a carrier fluid, sufficient strength to maintain propped fractures upon the removal of hydraulic pressure, and efficient conductivity once the wellbore is brought on production. With respect to the proppant particle transport properties, the settling rate of a proppant particle within a fracturing fluid at least in part determines its transport capacity within a hydraulic fracture. The settling rate of a proppant particle can be determined using Equation (1).

$$v = \frac{\rho_p - \rho_f}{18\eta} g\sigma^2, \qquad (1)$$

In Equation (1), v is the settling rate of the proppant particle, Pp-Pf is proportional to the density difference between the proppant particle and the carrier fluid, n is the viscosity of the carrier fluid, g is the gravitational constant, and $\sigma^2$ is proportional to the square of the proppant particle size. As will be appreciated, proppant particles having lower apparent densities and/or smaller particle sizes settle at a slower rate within an identical carrier fluid (thus having better transport) compared to higher apparent density and/or larger particle sized proppant particles.

Figure 2:
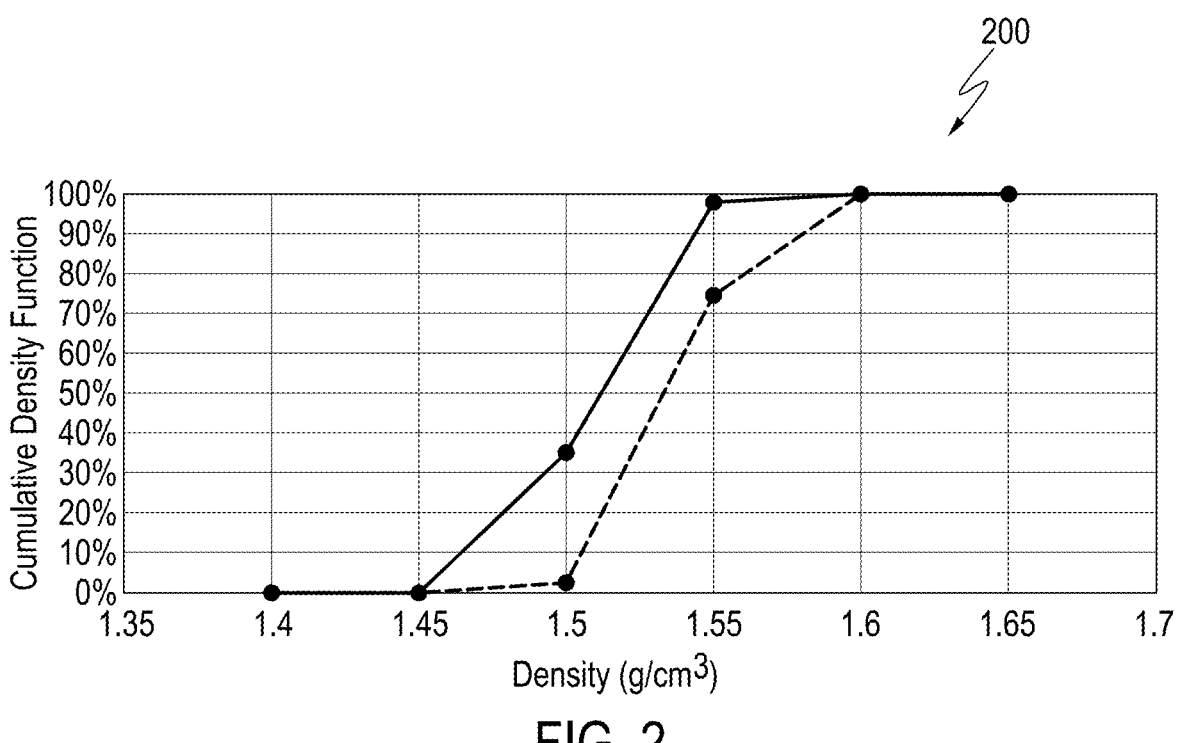
FIG. 2 is a graph showing cumulative density functions for fluid coke particles within two fluid coke samples.

We have found that coke particles, particularly petroleum coke particles, are particularly well-suited for utilization as a proppant during hydraulic fracturing operations due at least in part to the relatively low apparent densities of petroleum coke particles as compared to non-coke proppants (e.g., sand). This is illustrated by FIG. 1, which is a graph 100 comparing the apparent densities of petroleum coke particles within a petroleum coke sample to the apparent densities of sand particles within a sand sample. Specifically, the apparent densities of the petroleum coke particles (i.e., in this example, fluid coke particles) and the sand particles were determined in the laboratory by measuring the mass of each type of particle that settled in a given density of brine. Based on these measurements, the apparent densities of the petroleum coke particles ranged from around 1.3 g/cm³ to around 1.7 g/cm³, as shown at 102, while the apparent densities of the sand particles ranged from around 2.6 g/cm³ to around 2.7 g/cm³, as shown at 104. Therefore, the apparent density of petroleum coke is significantly lower than the apparent density of sand. Moreover, the apparent density of typical carrier fluid (e.g., water) generally ranges from around 1.0 g/cm³ to around 1.2 g/cm³, as shown at 106. Moreover, FIG. 2 is a graph 200 showing cumulative density functions for fluid coke particles within two fluid coke samples. As shown, the densities of the fluid coke particles ranged from around 1.4 g/cm³ to around 1.65 g/cm³.

Figures 3, 4:
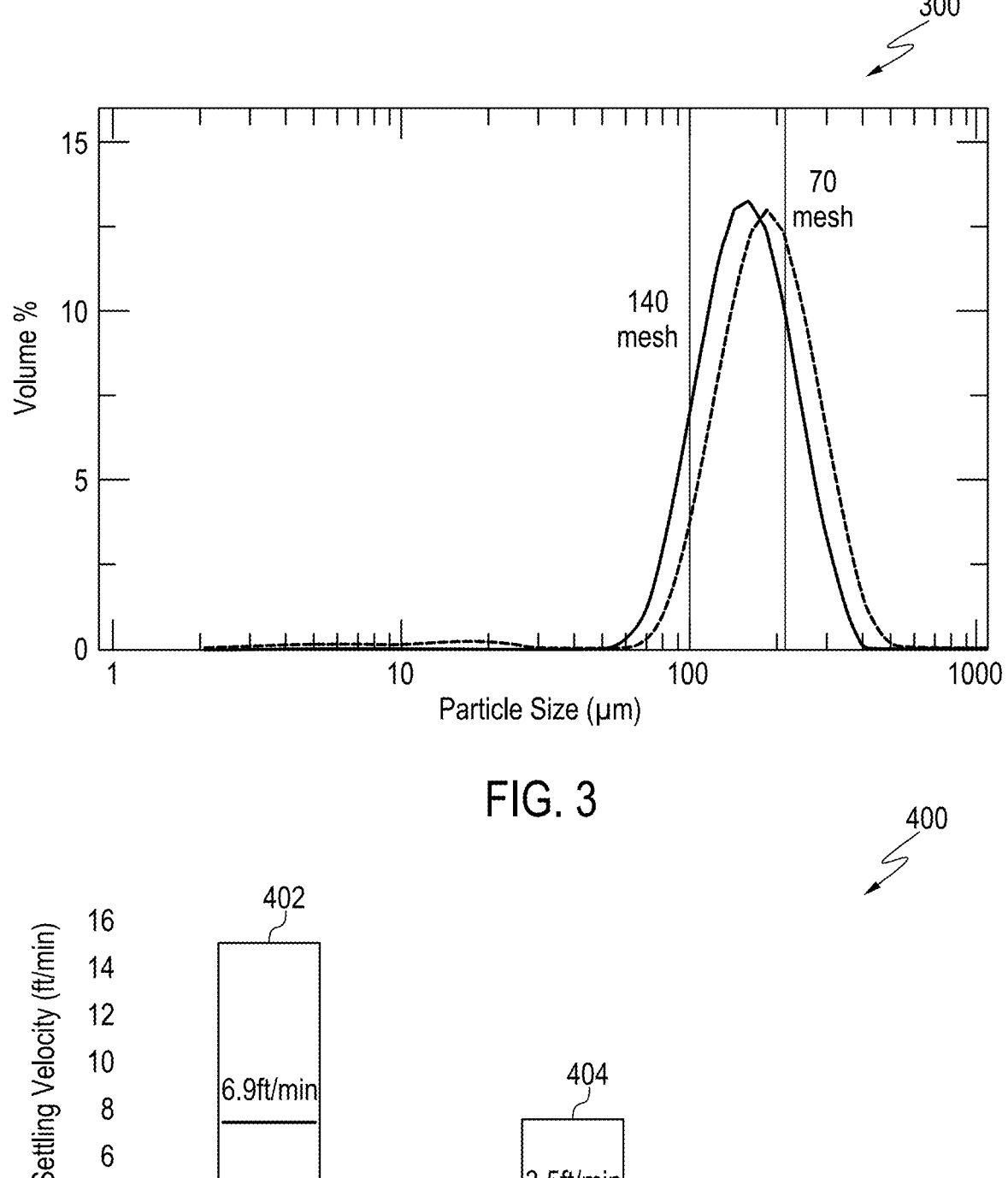
FIG. 3 is a graph showing particle size distributions for fluid coke particles within two fluid coke samples.
FIG. 4 is a bar graph showing the terminal settling velocities in recycled water for sand particles within a 40/70-mesh sand sample, sand particles within a 100-mesh sand sample, and fluid coke particles within a 100-mesh fluid coke sample.

The transport properties of coke proppant particles are further enhanced by the differentiated size distribution of such particles. Specifically, while the particle size of sand generally ranges from around 105 microns (μm) to around 850 μm (i.e., around 140 mesh to around 20 mesh), the particle size of petroleum coke can be varied such that it either approximates the particle size of sand or is provided with smaller particle sizes. As an example, FIG. 3 is a graph 300 showing particle size distributions for fluid coke particles within two fluid coke samples. As shown, the particle sizes for the two fluid coke samples were from around 100 μm to around 210 μm (i.e., around 140 mesh to around 70 mesh), which encompasses the lower end of the range of typical particle sizes for different types of sand. Moreover, as described further herein, petroleum coke particles may also be provided with much smaller particle sizes via the utilization of microproppant coke particles, which may have particle sizes of at most 105 μm (140 mesh) or, in some cases, at most than 88 μm (170 mesh), but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm).

As described above with respect to Equation (1), because petroleum coke particles have lower apparent densities and similar or smaller particle sizes as compared to non-coke proppants (e.g., sand), such petroleum coke particles also have lower settling rates within the carrier fluid and, therefore, have enhanced transport properties as compared to sand. This is illustrated by FIG. 4, which is a bar graph 400 showing the terminal settling velocities in recycled water for sand particles within a 40/70-mesh sand sample, sand particles within a 100-mesh sand sample, and fluid coke particles within a 100-mesh fluid coke sample. In particular, the average terminal settling velocity for the sand particles within the 40/70-mesh sand sample was 6.9 feet per minute (ft/min) (0.04 meters per second (m/s)), as shown at 402; the average terminal settling velocity for the sand particles within the 100-mesh sand sample was 3.5 ft/min (0.02 m/s), as shown at 404; and the average terminal settling velocity for the fluid coke particles within the 100-mesh fluid coke sample was 0.6 ft/min (0.003 m/s), as shown at 406. Therefore, fluid coke particles (which are representative of other types of petroleum coke particles) will clearly transport further into hydraulic fractures than sand particles. As a result, proppants formed at least in part from petroleum coke are capable of propping extended regions of new and/or existing hydraulic fractures, including primary and secondary fractures, that would not be effectively propped by non-coke proppants, thus increasing the overall SRV in the subterranean formation and leading to increased production performance for the corresponding hydrocarbon well.

Figures 5, 6:
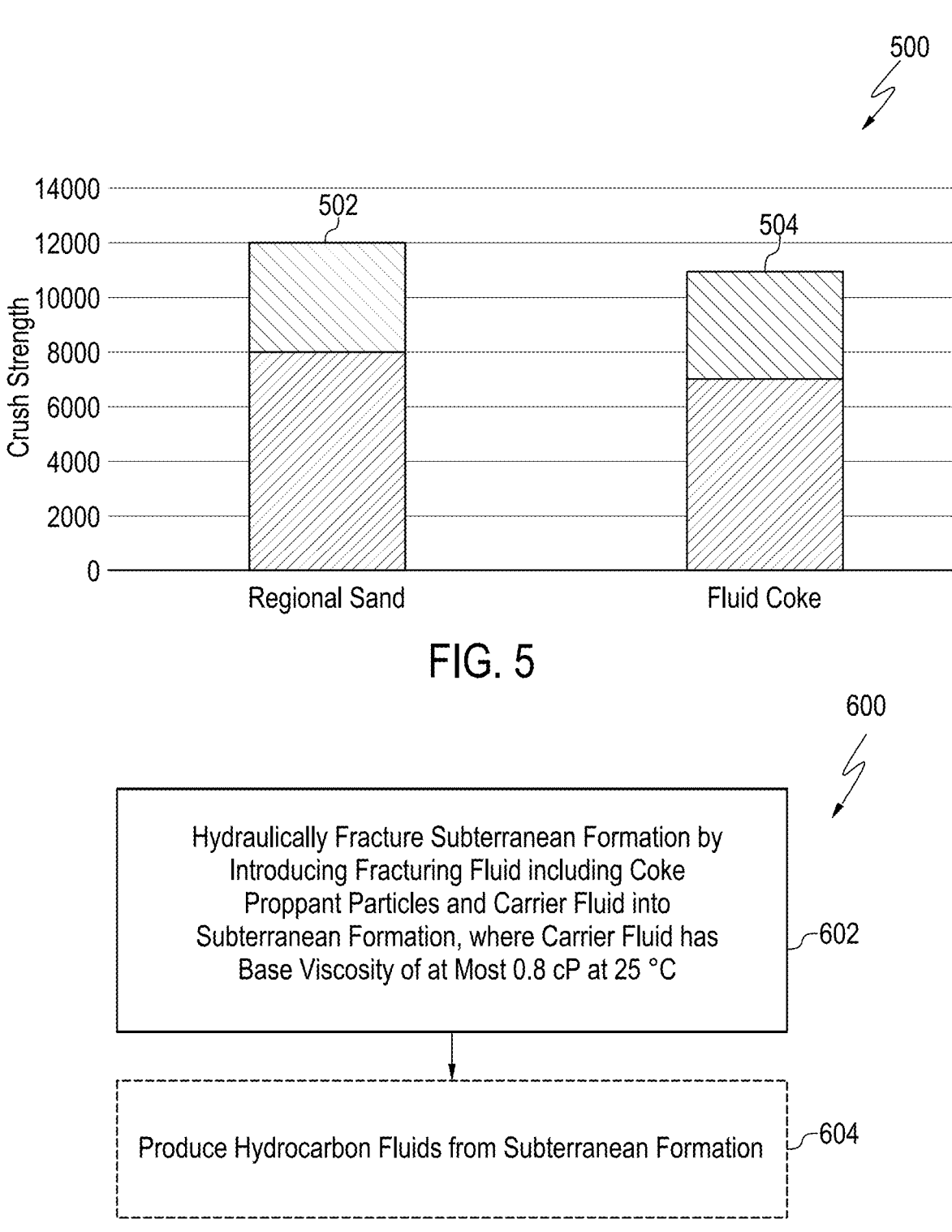
FIG. 5 is a bar graph comparing the crush strengths of sand particles within a regional sand sample to the crush strengths of fluid coke particles within a fluid coke sample.
FIG. 6 is a process flow diagram of an exemplary method for hydraulically fracturing a subterranean formation via a hydrocarbon well by utilizing fracturing fluids comprising coke proppant particles and a low-base-viscosity carrier fluid in accordance with the present disclosure.

Furthermore, the crush strength of a proppant particle is a measure of the particle's ability to withstand stresses within a hydraulic fracture, with efficient proppant particles being capable of resisting sustained loads within hydraulic fractures during the lifetime of the corresponding wellbore without compromising the hydraulic conductivity of such hydraulic fractures. As a result, proppant particles with higher crush strengths are favorable. According to API RP-19C standards, adequate proppant particles should have a crush strength indicating that less than 10% of fines are produced under a stress of 5,000 psi. In this regard, the crush strength of petroleum coke is advantageously comparable to the crush strength of sand. This is illustrated by FIG. 5, which is a bar graph 500 comparing the crush strengths of sand particles within a regional sand sample, as shown at 502, to the crush strengths of fluid coke particles within a fluid coke sample, as shown at 504. Such crush strength was determined according to API K crush strength testing by applying stress to the respective particles in increments of 1,000 psi until 10% fines were formed, with the crush strength of the particles within each sample being the pressure (in psi) at which 10% fines were formed. As shown in FIG. 5, the crush strength of fluid coke (which is representative of other types of petroleum coke) is comparable to the crush strength of regional sand.

With regard to the erosive properties of petroleum coke particles as compared to sand particles, it is noted that sand particles have a hardness of around 7 on the Mohs hardness scale, while petroleum coke particles have a hardness of less than around 6 on the Mohs hardness scale. Therefore, petroleum coke particles are expected to be less erosive than sand particles and are less likely to cause substantial erosion within the production causing string, including, in particular, the erosion of the perforation clusters.

Any suitable type(s) of petroleum coke and/or other type(s) of coke may be used for the coke proppant particles described herein. For example, the coke proppant particles may include but are not limited to fluid coke particles, flexicoke particles, delayed coke particles, thermally post-treated coke particles, pyrolysis coke particles, coal-derived coke particles (e.g., blast furnace coke particles and/or metallurgical coke particles), microproppant coke particles, or any combination thereof.

For embodiments in which flexicoke particles are utilized as at least a portion of the coke proppant particles described herein, such flexicoke particles are produced via the FLEXI-COKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOK-ING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., from around 85, 87, 89, 91 wt %, to 93, 95, 97, 99 wt %); a weight ratio of carbon to hydrogen that is in a range from around 80:1 to around 95:1 (e.g. from around 80:1, 85:1, to 90:1, 95:1); and an impurities content (i.e., a weight percent of all components other than carbon and hydrogen) that is in a range from around 1 wt % to around 10 wt % (e.g., around found 1, 2, 3, 4, 5 wt %, to 6, 7, 8, 9, 10 wt %). Flexicoke also has a higher metal content than other cokes. In particular, the flexicoke particles may have a combined vanadium and nickel content that is in a range from around 3,000 parts per million (ppm) to around 45,000 ppm (e.g., from around 3,000, 10,000, 15,000 ppm, to 20,000, 25,000, 30,000 ppm, to 35,000, 40,000, 45,000 pm). In addition, the flexicoke particles may have a sulfur content that is in a range from 0 wt % to around 5 wt % (e.g. from 0, 1, 2 wt %, to 3, 4, 5 wt %), as well as a nitrogen content that is in a range from 0 wt % to around 3 wt % (e.g., from 0, 0.5, 1.0, 1.5 wt %, to 2.0 2.5, 3.0 wt %).

The apparent density of the flexicoke particles may be in a range from around 1.0 g/cm$^3$ to around 2.0 g/cm$^3$ (e.g., from around 1.0, 1.1, 1.2, 1.3 g/cm$^3$, to 1.4, 1.5, 1.6, 1.7 g/cm$^3$, to 1.8, 1.9, 2.0 g/cm$^3$). Conventional sand-based proppants generally have apparent densities of at least around 2.5 g/cm$^3$. Thus, the flexicoke particles have substantially lower apparent densities compared to conventional, sand-based proppants, which is indicative of their comparably more effective transport and lower settling rates within a fracture formed as part of a hydraulic fracturing operation.

For embodiments in which fluid coke particles are utilized as at least a portion of the coke proppant particles described herein, such fluid coke particles are obtained via a fluid coking process. Generally-speaking, flexicoke is considered to be a type (or subset) of fluid coke. Therefore, as expected, the fluid coke particles include a number of the same (or similar) characteristics as flexicoke. However, the fluid coking process may be manipulated in various ways to produce fluid coke particles having a number of distinctive characteristics. For example, the fluid coke particles may have a carbon content that is in a range from around 75 wt % to around 93 wt % (e.g., from around 75, 77, 79, 81, 83 wt %, to 85, 87, 91, 93 wt %); a weight ratio of carbon to hydrogen that is in a range from around 30:1 to around 50:1 (e.g., around 30:1, 35:1, to 40:1, 45:1, 50:1); and an impurities content that is in a range from around 5 wt % to around 25 wt % (e.g., from around 5, 10, 15 wt %, to 20, 25 wt %). The fluid coke particles may also have a sulfur content that is in a range from around 3 wt % to around 10 wt % (e.g., from around 3, 4, 5, 6 wt %, to 7, 8, 9, 10 wt %), as well as a nitrogen content that is in a range from around 0.5 wt % to around 3 wt % (0.5, 1.0, 1.5 wt %, to 2.0, 2.5, 3.0 wt %). In addition, the apparent density of the fluid coke particles may be in a range from around 1.4 $g/cm^3$ to around 2.0 $g/cm^3$ (e.g., from around 1.4, 1.5, 1.6 $g/cm^3$, to 1.7, 1.8, 1.9, 2.0 $g/cm^3$).

For embodiments in which delayed coke particles are utilized as at least a portion of the coke proppant particles described herein, such delayed coke particles are produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature that is in a range from around 480° C. to around 515° C. The heated feedstock then enters a reactor, referred to as a "coke drum," which typically operates at temperatures that are in a range from around 415° C. to around 450° C. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are typically used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke particles may exhibit the following properties: (1) a carbon content that is in a range from around 82 wt % to around 90 wt % (e.g., from around 82, 83, 84, 85 wt %, to 86, 87, 88, 89, 90 wt %); (2) a weight ratio of carbon to hydrogen that is in a range from around 15:1 to around 30:1 (e.g., from around 15:1, 20:1, to 25:1, 30:1); (3) a combined vanadium and nickel content that is in a range from around 100 ppm to around 3,000 ppm (e.g., from around 100, 500, 1,000, 1,500 ppm, to 2,000, 2,500, 3,000 ppm); (4) a sulfur content that is in a range from around 2 wt % to around 8 wt % (e.g., from around 2, 3, 4, 5 wt %, to 6, 7, 8 wt %); and/or (5) a nitrogen content that is in a range from around 1 wt % to around 2 wt % (e.g., from around 1.0, 1.2, 1.4 wt %, to 1.6, 1.8, 2.0 wt %), where such properties are measured on a dry, ash-free basis (or, in other words, not counting residual ash content and removing moisture before the analysis). In addition, the delayed coke particles may have a moisture content that is in a range from around 6 wt % to around 14 wt % (e.g., from around 6, 8, 10 wt %, to 12, 14 wt %) and a volatile matter content that is in a range from around 6 wt % to around 18 wt % (e.g., from around 6, 8, 10, 12 wt %, to 14, 16, 18 wt %), as measured on an as-received basis. Moreover, the apparent density of the delayed coke particles may be in a range from around 1.0 $g/cm^3$ to around 1.7 $g/cm^3$ (e.g., from around 1.0, 1.1, 1.2, 1.3 $g/cm^3$, to 1.4, 1.5, 1.6, 1.7 $g/cm^3$). Furthermore, the crush strength of the delayed coke particles may be comparable to the crush strengths of other types of petroleum coke particles.

For embodiments in which microproppant coke particles are utilized as at least a portion of the coke proppant particles described herein, such microproppant coke particles may include wet flexicoke fines and/or dry flexicoke fines produced as a byproduct of the FLEXICOKING™ process. Additionally or alternatively, the microproppant coke particles may include sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke). Additionally or alternatively, in some embodiments, the microproppant coke particles may include ground fluid coke, ground flexicoke, ground delayed coke, ground thermally post-treated coke, ground pyrolysis coke, and/or ground coal-derived coke (e.g., ground blast furnace coke and/or ground metallurgical coke). Moreover, any other suitable types of microproppant coke particles may be additionally or alternatively utilized.

With respect to the utilization of microproppant coke particles including wet and/or dry flexicoke fines as at least a portion of the coke proppant particles described herein, such flexicoke fines are byproducts of the FLEXICOKING™ process, which are collected as particles that were not recovered in the secondary cyclones of the heater within the flexicoker. More specifically, the particles are collected first in the tertiary cyclone as dry flexicoke fines, and the smaller particles that travel past the tertiary cyclone are then recovered in the venturi scrubber as wet flexicoke fines. While at least a portion of such flexicoke fines would typically be considered as waste, the present disclosure provides for the effective utilization of such flexicoke fines during hydraulic fracturing operations.

With respect to the utilization of microproppant coke particles including sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke) as at least a portion of the coke proppant particles described herein, any suitable type(s) of filters, screens, and/or associated machinery may be utilized to separate any suitable type(s) of bulk coke granules into larger particles as well as smaller particles that are suitable for utilization as the microproppant coke particles. Furthermore, with respect to the utilization of microproppant coke particles including ground fluid coke, ground flexicoke, ground delayed coke, ground thermally post-treated coke, ground pyrolysis coke, and/or ground coal-derived coke (e.g., ground blast furnace coke and/or ground metallurgical coke) as at least a portion of the coke proppant particles described herein, any suitable type(s) of grinding/milling technique(s) may be used to produce such microproppant coke particles. For example, in some embodiments, coke granules may be processed using hammer milling techniques, jet milling techniques, ball milling techniques, or the like, where each of these techniques generally involves crushing or pulverizing the coke granules to a suitable size and shape. Moreover, those skilled in the art will appreciate that any number of other grinding, milling, or other processing techniques may be additionally or alternatively used, depending on the details of the particular implementation.

In various embodiments, the microproppant coke particles that may be utilized according to embodiments described herein include particle sizes of at most 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm). Moreover, in various embodiments, such microproppant coke particles have an apparent density that is in a range from around 1.0 g/cm$^3$ to around 2.0 g/cm$^3$ (e.g., from around 1.0, 1.1, 1.2, 1.3 g/cm$^3$, to 1.4, 1.5, 1.6, 1.7 g/cm$^3$, to 1.8, 1.9, 2.0 g/cm$^3$), although the exact apparent density of the particles may vary depending on the specific type(s) of coke utilized. By comparison, sand generally has an apparent density of at least around 2.5 g/cm$^3$. Therefore, because the settling rate is proportional to the difference in density between the solid particles and the carrier fluid (as shown in expressions for both Stokes terminal settling velocity and Ferguson & Church settling velocity), such microproppant coke particles have a significantly lower settling rate than sand. As a result, proppant particles formed from microproppant coke particles will perform better than proppant particles formed from sand in terms of transport capacity within hydraulic fractures that are created, reopened, and/or extended during a hydraulic fracturing operation.

Furthermore, with respect to the utilization of microproppant coke particles as at least a portion of the coke proppant particles described herein, such microproppant coke particles provide a number of additional advantages over non-coke proppants. As an example, the microproppant coke particles are small enough to enter regions of secondary and natural fractures that cannot be effectively reached by non-coke proppants. As another example, due to the enhanced transport properties of the microproppant coke particles, such particles are capable of creating larger hydraulic fractures (i.e., by increasing one or more dimensions of such hydraulic fractures, such as the fracture lengths, heights, and/or azimuths) than non-coke proppants. As another example, the utilization of the microproppant coke particles as at least a portion of the coke proppant particles described herein may enable the flow rate of the fracturing fluid to be increased since a portion of the fracturing fluid may be diverted into the secondary hydraulic fractures and/or the natural fractures. As another example, the utilization of the microproppant coke particles as at least a portion of the coke proppant particles described herein may help to control the leak-off of the fracturing fluid into the secondary and natural fractures, thereby increasing the fracturing fluid efficiency and leading to the creation of larger conductive fractures.

Turning to details regarding exemplary characteristics of the fracturing fluid in which the coke proppant particles described herein may be employed, such fracturing fluid may include (in addition to the coke proppant particles) a flowable carrier fluid with a base viscosity of at most 0.8 cP at 25° C., optionally one or more auxiliary components (i.e., additives), and optionally one or more other types of proppant particles. In various embodiments, the fracturing fluid is formulated at the well site in a mixing process that is conducted concurrently with the pumping of the fracturing fluid into the wellbore during the hydraulic fracturing process. When the fracturing fluid is formulated at the well site, the coke proppant particles may be added in a manner similar to known methods for adding proppant to fracturing fluid.

The carrier fluid according to the present disclosure has a base viscosity of at most 0.8 cP at 25° C. (e.g., potentially ranging from around 0.01, 0.02, 0.04, 0.05 cP at 25° C., to 0.06, 0.07, 0.08 cP at 25° C., to 0.1, 0.2, 0.3, 0.4 cP at 25°

C. to around 0.5, 0.6, 0.7, 0.8 cP at 25° C.). Suitable carrier fluids may be hydrophobic fluids and/or gases and may include but are not limited to $CO_2$, NG (e.g., uncompressed natural gas, CNG), LNG), LPG, $N_2$ (e.g., nitrogen gas, $LN_2$), NGLs (e.g., Y-grade NGL), single light hydrocarbons (e.g., methane, ethane, propane, butane, isobutane, pentane, and/or hexane), mixtures of C4 hydrocarbons, mixtures of C5 hydrocarbons, mixtures of C6 hydrocarbons, and any combination or mixture of two or more thereof. Moreover, in various embodiments, any other hydrophobic fluids and/or gases could be used as the carrier fluid (or at least a portion thereof). In various embodiments, concentrations of such hydrophobic fluids and/or gases could range from around 10% by volume at downhole conditions (e.g., if the hydrophobic fluids and/or gases are added to water) to 100% (e.g., if the hydrophobic fluids and/or gases are pumped pure).

Taking $CO_2$ as an example, the carrier fluid may include liquid $CO_2$ and/or supercritical $CO_2$. While fracturing fluids including liquid and/or supercritical $CO_2$ have been shown to be capable of improving displacement of hydrocarbons from the matrix and may be capable of creating complex fracture networks within a subterranean formation, the utilization of $CO_2$ for hydraulic fracturing operations has been limited due to $CO_2$'s poor ability to effectively transport non-coke proppants, such as sand, for long distances. However, the coke proppant particles described herein are particularly well-suited for effective transportation within $CO_2$-based carrier fluid. Accordingly, in some embodiments, the method described herein includes utilizing liquid and/or supercritical $CO_2$ as at least a portion of the carrier fluid within the fracturing fluid described herein during at least a portion of the hydraulic fracturing operations for an unconventional reservoir.

In some embodiments, the carrier fluid according to the present disclosure may be an energized carrier fluid that is formed from an aqueous carrier fluid in combination with a gas, such as $CO_2$. Such aqueous carrier fluids may include, for example, fresh water, salt water (including seawater), treated water (e.g., treated production water), one or more other forms of aqueous fluid, or any combination thereof. In such embodiments, the energized carrier fluid may include an aqueous carrier fluid that may be 10% to 90% gas by volume (e.g., 10%, 20%, 30%, 40% gas by volume, to 50%, 60%, 70%, 80%, 90% gas by volume).

The fracturing fluid according to the present disclosure may contain one or more additives or auxiliary components. Such additives or auxiliary components may include but are not limited to one or more acids, one or more biocides, one or more breakers, one or more corrosion inhibitors, one or more crosslinkers, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more foaming agents, one or more stabilizers, one or more chelating agents, one or more mutual solvents, one or more oxidizers, one or more reducers, one or more clay stabilizing agents, or any combination thereof. Moreover, in some embodiments, one or more viscosifying agents, such as one or more gels and/or one or more high-viscosity, high-concentration friction reducers, may be added to the fracturing fluid. Notably, however, the utilization of a relatively low-base-viscosity carrier fluid in combination with coke proppant particles according to aspects and embodiments described herein may enable the advantageous reduction or elimination of such viscosifying agents within the fracturing fluid.

With regard to the utilization of coke proppant particles during hydraulic fracturing operations according to aspects and embodiments described herein, the present disclosure provides methods of hydraulic fracturing using a fracturing fluid comprising coke proppant particles and a low-base-viscosity carrier fluid. Such coke proppant particles may be used, alone or in combination with one or more other types of proppant particles, during the hydraulic fracturing operation. That is, the coke proppant particles may form the entirety of a proppant pack or may form an integral part of a proppant pack. Other proppant types that may be utilized with the coke proppant include but are not limited to non-coke proppants (e.g., sand, crushed granite, and/or ceramic beads), lightweight proppants (LWPs), and ultra-LWPs (ULWPs). Moreover, in some embodiments, proppants formed at least in part from fly ash may be utilized with the coke proppant particles described herein. Proppants including other materials are also within the scope of the present disclosure, provided that any such selected proppants are able to maintain their integrity upon removal of hydraulic pressure within an induced hydraulic fracture, such that around 80%, preferably around 90%, and more preferably around 95% or greater of the particle mass of the proppant particles retains integrity when subjected to 5,000 psi of stress, a condition that is also met by the coke proppant particles described herein. That is, both the coke proppant particles and any other type(s) of proppant particles utilized according to embodiments described herein are capable of maintaining mechanical integrity upon fracture closure, as such particles (at least partially) intermingle or otherwise associate to form functional proppant packs for a successful hydraulic fracturing operation.

The methods described herein include the preparation of the fracturing fluid, which is not considered to be particularly limited because the coke proppant particles are capable of transportation in dry form or as part of a wet slurry from a manufacturing site (e.g., a refinery or synthetic fuel plant). Dry and wet forms may be transported via truck or rail, and wet forms may further be transported via pipelines. The transported dry and/or wet forms of the coke proppant particles may be added to the carrier fluid, including the optional additives/auxiliary components and/or any other type(s) of proppant particles, at a production site, either directly into a wellbore or by pre-mixing in a hopper or other mixing equipment. For example, in some embodiments, slugs of the dry and/or wet forms of the coke proppant particles are added directly to the low-base-viscosity carrier fluid (e.g., as it is introduced into the wellbore). In other embodiments, a portion or all of the fracturing fluid is pre-mixed at the production site, or (for embodiments in which other proppant type(s) are utilized along with the coke proppant particles) each proppant type is added directly to the fracturing fluid. Any other suitable mixing or adding of the coke proppant particles to produce a desired fracturing fluid composition may also be used, without departing from the scope of the present disclosure.

The methods of hydraulic fracturing suitable for use in one or more embodiments described herein involve pumping the fracturing fluid comprising the coke proppant particles and the low-base-viscosity carrier fluid at a high pump rate into a subterranean formation to form hydraulic fractures in the subterranean formation. In various embodiments, this process is conducted one stage at a time along a wellbore. Specifically, the stage of interest is hydraulically isolated from any other stages that have been previously hydraulically fractured and propped. In some embodiments, the stage of interest includes perforation clusters within the production casing string of the wellbore, which enable the fracturing fluid to flow out of the wellbore and into the subterranean formation. In some embodiments, the pump rate of the fracturing fluid during the hydraulic fracturing operation is at least around 20 barrels per minute (bbl/min) (0.05 cubic meters per second (m³/s)), preferably at least around 30 bbl/min (0.08 m³/s), and more preferably at least 50 bbl/min (0.14 m³/s) and at most 1000 bbl/min (2.73 m³/s) at one or more time durations during the hydraulic fracturing operation (e.g., the rate may be constant, steadily increased, or pulsed). These high rates may, in some embodiments, be utilized after around 10% of the entire volume of fracturing fluid to be pumped into the subterranean formation has already been injected. That is, at the early periods of the hydraulic fracturing operation, the pump rate may be lower and as hydraulic fractures begin to form, the pump rate may be increased. Generally, the average pump rate of the fracturing fluid throughout the hydraulic fracturing operation may be around 10 bbl/min (0.03 m³/s), preferably around 15 bbl/min (0.04 m³/s), and more preferably at least 25 bbl/min (0.07 m³/s) and at most 250 bbl/min (0.68 m³/s). Typically, the pump rate of the fracturing fluid during the hydraulic fracturing operation for more than 30% of the time required to complete the hydraulic fracturing with respect to a particular stage may be in the range of around 20 bbl/min (0.05 m³/s) to around 150 bbl/min (0.41 m³/s), or around 40 bbl/min (0.11 m³/s) to around 120 bbl/min (0.33 m³/s), or around 40 bbl/min (0.11 m³/s) to around 100 bbl/min (0.27 m³/s).

In various embodiments, the methods of hydraulic fracturing described herein may be performed such that the concentration of the coke proppant particles (and any other type(s) of proppant particles) within the injected fracturing fluid is altered on-the-fly or in real-time while the hydraulic fracturing operation is being performed, such that the hydraulic pressure is maintained in the subterranean formation and the hydraulic fractures. For example, in some embodiments, the initially-injected fracturing fluid is injected at a low pump rate and includes around 1 weight percent (wt %) proppant particles (i.e., including the coke proppant particles and any other type(s) of proppant particles) based on the total weight of the fracturing fluid (i.e., including the carrier fluid, the coke proppant particles, any other type(s) of proppant particles, and any additives/auxiliary components). As hydraulic fractures begin to form and grow, the pump rate may be increased, and the concentration of the proppant particles may be increased in a stepwise fashion (with or without a corresponding stepwise increase in pump rate), with a maximum concentration of total proppant particles potentially reaching around 2.5 wt % to around 20 wt %, for example, based on the total weight of the fracturing fluid. For example, the maximum concentration of total proppant particles may reach at least 2.5 wt %, preferably at least 8 wt %, and more preferably at least 16 wt %. In some embodiments, all of the proppant particles are coke particles. In other embodiments, at one or more time periods during the hydraulic fracturing operation, at least around 2 wt % to around 100 wt % of any proppant particles suspended within the fracturing fluid are coke particles, such as at least around 2 wt %, preferably at least around 15 wt %, more preferably at least around 25 wt %, and up to 100 wt % in some cases.

In various embodiments, the coke proppant particles are introduced into the subterranean formation during the pad phase of the hydraulic fracturing operation to allow the coke proppant particles to travel within the fracturing fluid into the tips (or at least within proximity to the tips) of the formed hydraulic fractures. In such embodiments, the coke proppant particles may also be introduced into the subterranean formation during the later phases of the hydraulic fracturing operation such that the later-introduced slurry of carrier fluid and coke proppant particles continues to displace the earlier-introduced slurry of carrier fluid and coke proppant particles further away from the wellbore. Moreover, in some embodiments, the coke proppant particles are introduced into the subterranean formation throughout the hydraulic fracturing operation, either continuously or intermittently. In such embodiments, the ratio of coke proppant particles to other type(s) of proppant particles, if any, introduced into the subterranean formation may be maintained at a steady (or substantially steady) value, or the ratio may be modified as the hydraulic fracturing operation progresses.

The hydraulic fracturing methods described herein may be performed in drilled hydrocarbon-producing wellbores including vertical, deviated, highly deviated, and/or lateral sections. Such wellbores may be drilled into various types of unconventional subterranean formations, including but not limited to tight sandstone formations, tight carbonate formations, shale gas formations, coal bed methane formations, and/or tight oil formations. As described herein, such wellbores are typically completed using casing strings that are cemented into the subterranean formation. To contact the subterranean formation, a number of perforation clusters can be created through the production casing string, in which case the wellbore may be referred to as a plug and perforated ("plug-and-perf") cased-hole completion. Alternative completion techniques may be used without departing from the scope of the present disclosure, but in each completion technique, a finite length of the wellbore is exposed for hydraulic fracturing and injection of the fracturing fluid. This finite section is referred to herein as a "stage." Full completion of a horizontal well typically includes hydraulic fracturing of multiple stages performed sequentially. In plug-and-perf completions, the stage length may be based on a distance over which the tubular and cement has been perforated, and may be in excess of around 25 ft (7.6 m), but more typically in excess of around 100 ft (30.5 m).

During the plug-and-perf process, the stage of interest may be isolated using one or more diversions materials such that the pressurized fracturing fluid flows through the perforation clusters within the particular stage and into the subterranean formation to generate one or more hydraulic fractures in only the stage area. Such diversion materials may include but are not limited to one or more types of plugs (e.g., bridge plugs, packers, baffle/plug combinations, or the like), one or more types of particulate diverters (e.g., sand, ceramic material, salt, wax, resin, and/or other compounds), one or more types of perforation plugging devices, one or more types of ball-and-seat devices (e.g., ball sealers, with or without retaining devices), one or more types of chemical diverters (e.g., liquids and/or gels), and/or one or more types of dart-and-sleeve devices (e.g., any type of sleeve device in which a ball or dart is dropped from the surface, contacting and opening a particular sleeve, which permits injections into a new stage, while simultaneously blocking flow to the stages below). Moreover, in some embodiments, at least a portion of such diversion materials are provided in dissolvable, biodegradable, or self-destructible form, such that the diversion materials are designed to dissolve, degrade, or self-destruct, respectively, and then flow out of the wellbore, potentially without performing a wellbore cleanout procedure.

For each linear foot of a stage, at least around 6 barrels (0.95 cubic meters ($m^3$)), preferably around 24 barrels (3.8

$m^3$), and more preferably at least 60 barrels (9.5 $m^3$) and at most 6,000 barrels (953.9 $m^3$) of fracturing fluid may be injected to grow the hydraulic fractures. In certain embodiments, for each linear foot of a stage, at least around 0.3 barrels (0.05 $m^3$), preferably around 1.1 barrels (0.2 $m^3$), and more preferably at least 2.8 barrels (0.4 $m^3$) and at most 285 barrels (45.3 $m^3$), or no more than 143 barrels (22.7 $m^3$), or no more than 114 barrels (18.1 $m^3$), of proppant particles (i.e., including the coke proppant particles and any other type(s) of proppant particles) may be injected to prop the hydraulic fractures.

Turning to details of an exemplary hydraulic fracturing method according to the present disclosure, FIG. 6 is a process flow diagram of an exemplary method 600 for hydraulically fracturing a subterranean formation via a hydrocarbon well by utilizing fracturing fluids comprising coke proppant particles and a low-base-viscosity carrier fluid in accordance with the present disclosure. The exemplary method 600 begins at block 602, at which a subterranean formation is hydraulically fractured (e.g., via a wellbore) by introducing a fracturing fluid including coke proppant particles and a carrier fluid with a base viscosity of at most 0.8 cP at 25° C. into the subterranean formation. In some embodiments, the carrier fluid $CO_2$, NG, NGL, LPG, $N_2$, or any mixture of two or more thereof. Additionally or alternatively, in some embodiments, the carrier fluid includes CNG, LNG, $LN_2$, NGL, LPG, or any mixture of two or more thereof. Additionally or alternatively, in some embodiments, the carrier fluid includes a single light hydrocarbon. Moreover, in some embodiments, the carrier fluid includes an energized carrier fluid, as described herein.

In some embodiments, the fracturing fluid has a viscosity no greater than 50 cP at 25° C. In some embodiments, the fracturing fluid is essentially free of a viscosifying agent.

In some embodiments, one or more diversion materials are used to direct the flow of the fracturing fluid within the wellbore. Such diversion material(s) may include but are not limited to one or more plugs, one or more particulate diverters, one or more perforation plugging devices, one or more ball-and-seat devices, one or more chemical diverters, and/or one or more dart-and-sleeve devices. Moreover, in some embodiments, the diversion material(s) (or at least a portion thereof) are dissolvable, biodegradable, or self-destructible.

In some embodiments, the coke proppant particles include fluid coke, flexicoke, delayed coke, thermally post-treated coke, pyrolysis coke, and/or coal-derived coke (e.g., blast furnace coke and/or metallurgical coke). In some embodiments, the coke proppant particles include microproppant coke particles. In such embodiments, the microproppant coke particles may include wet flexicoke fines and/or dry flexicoke fines. Additionally or alternatively, in such embodiments, the microproppant coke particles may include sieved fluid coke, sieved flexicoke, sieved delayed coke, sieved thermally post-treated coke, sieved pyrolysis coke, and/or sieved coal-derived coke (e.g., sieved blast furnace coke and/or sieved metallurgical coke). Additionally or alternatively, in such embodiments, the microproppant coke particles may include ground fluid coke, ground flexicoke, ground delayed coke, ground thermally post-treated coke, ground pyrolysis coke, and/or ground coal-derived coke (e.g., ground blast furnace coke and/or ground metallurgical coke).

In various embodiments, the fracturing fluid is introduced into the subterranean formation for at least one stage of the hydrocarbon well. For at least one stage, and preferably for each stage, the fracturing fluid including the carrier fluid and the coke proppant particles may be introduced into the subterranean formation during at least a portion of the pad phase of the hydraulic fracturing operation, prior to the introduction of a second fracturing fluid including carrier fluid and non-coke proppant particles into the subterranean formation. In some such embodiments, the non-coke proppant particles includes sand, LWP, ULWP, and/or fly ash. Alternatively, for at least one stage, and preferably for each stage, the fracturing fluid itself may include the non-coke proppant particles (in addition to the coke proppant particles), and the fracturing fluid including the carrier fluid, the coke proppant particles, and the non-coke proppant particles may be introduced into the subterranean formation during at least a portion of the pad phase of the hydraulic fracturing operation, as well as during at least a portion of the remainder of the hydraulic fracturing operation.

In some embodiments, the fracturing fluid also includes one or more additives (i.e., auxiliary components). For the purpose of this application, such additives are not considered as part of the carrier fluid. Such additives may include but are not limited to one or more acids, one or more biocides, one or more breakers, one or more corrosion inhibitors, one or more crosslinkers, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more foaming agents, one or more stabilizers, one or more chelating agents, one or more mutual solvents, one or more oxidizers, one or more reducers, one or more clay stabilizing agents, and/or one or more viscosifying agents.

Furthermore, at optional block 604, hydrocarbon fluids are produced from the subterranean formation subsequent to the hydraulic fracturing of the subterranean formation.

According to aspects and embodiments described herein, the utilization of the fracturing fluid during the hydraulic fracturing at block 602 increases the overall SRV in the subterranean formation, leading to enhanced production performance for the hydrocarbon well.

Those skilled in the art will appreciate that the exemplary method 600 of FIG. 6 is susceptible to modification without altering the technical effect provided by the present disclosure.

For example, in some embodiments, one or more blocks may be omitted from the method 600, and/or one or more blocks may be added to the method 600. In practice, the exact manner in which the method 600 is implemented will depend at least in part on the details of the specific implementation.

Another method according to the present disclosure may include providing the carrier fluid described with respect to the method 600 and then forming a fracturing fluid comprising the carrier fluid and coke proppant particles. In various embodiments, forming the fracturing fluid may include mixing the carrier fluid with the coke proppant particles, optional non-coke proppant particles, and at least one auxiliary component. Moreover, in various embodiments, such method may also include injecting the fracturing fluid into a subterranean formation.

Figure 7:
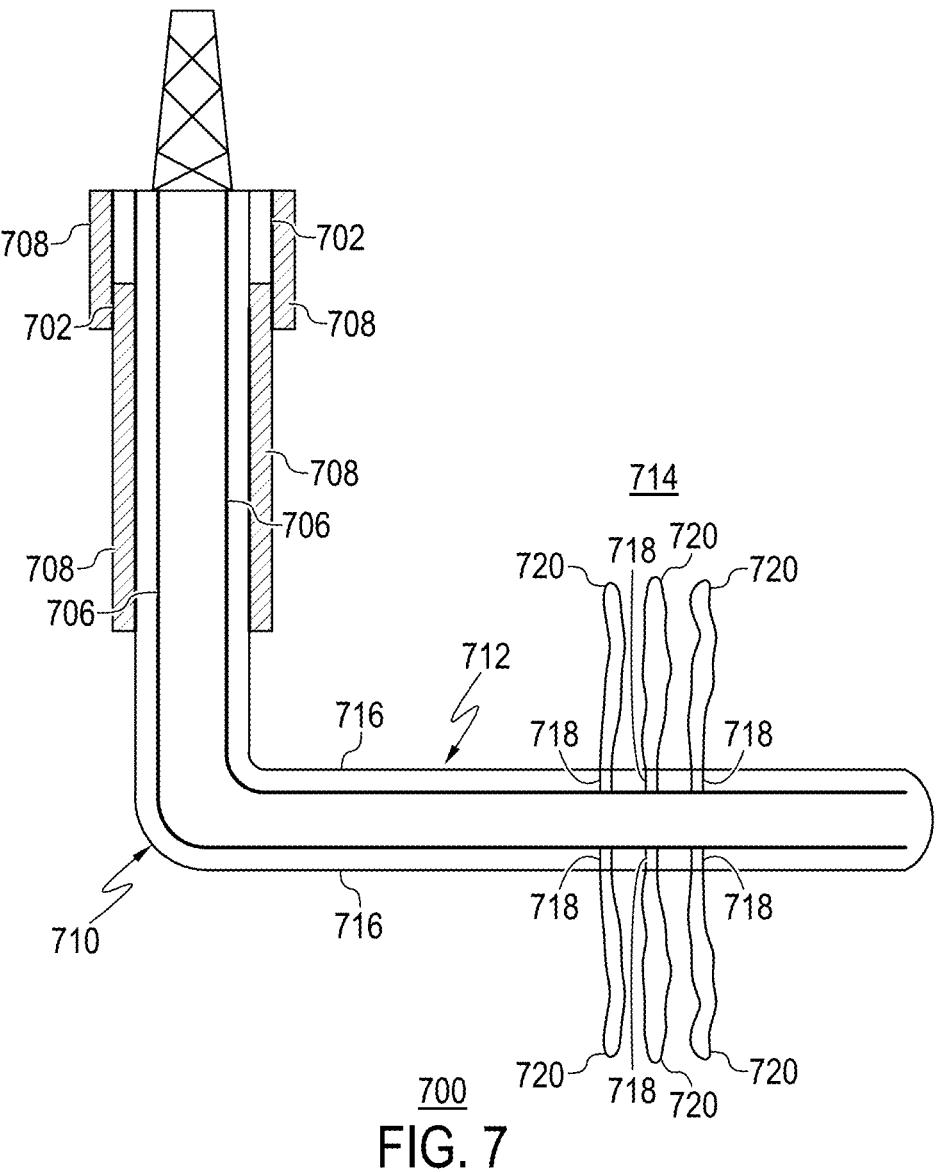
FIG. 7 is a diagram of a hydrocarbon well that may be subject to a hydraulic fracturing operation, in accordance with the present disclosure.

FIG. 7 is a diagram of a hydrocarbon well that may be subject to a hydraulic fracturing operation, in accordance with the present disclosure. FIG. 7 shows a hydrocarbon well 700. The hydrocarbon well 700 is coupled to one or more casing strings. The casing strings include a surface casing string 702 and a production casing string 706. The various casing strings of FIG. 7 are shown being held in place using cement 708. The hydrocarbon well 700 includes a heel 710 that connects the vertical section of the hydrocarbon well 700 to a horizontal section 712 of the hydrocarbon well 700. In various embodiments, the production casing string 706 is exposed to rock in a formation 714. The production casing string 706 extends into the formation 714 through a wellbore 716.

The production casing string 706 includes a plurality of perforations 718. As explained herein, a plurality of hydraulic fractures 720 extend from the production string 706 into the formation 714.

This disclosure can include one or more of the following non-limiting aspects and embodiments:

A1. A method, comprising hydraulically fracturing a subterranean formation by introducing a fracturing fluid comprising coke proppant particles and a carrier fluid into the subterranean formation, wherein the carrier fluid has a base viscosity of at most 0.8 cP at 25° C.

A2. The method of A1, wherein the carrier fluid comprises $CO_2$, NG, NGL, LPG, $N_2$, or any mixture of two or more thereof.

A3. The method of A1 or A2, wherein the carrier fluid comprises CNG, LNG, $LN_2$, NGL, LPG, or any mixture of two or more thereof.

A4. The method of any of A1 to A3, wherein the carrier fluid comprises a single light hydrocarbon.

A5. The method of any of A1 to A4, wherein the carrier fluid comprises an energized carrier fluid.

A6. The method of A5, wherein the energized carrier fluid comprises an aqueous carrier fluid that is 10% to 90% gas by volume.

A7. The method of any of A1 to A6, wherein the coke proppant particles comprise at least one of: fluid coke; flexicoke; delayed coke; thermally post-treated coke; pyrolysis coke; and coal-derived coke.

A8. The method of any of A1 to A7, wherein the coke proppant particles comprise microproppant coke particles.

A9. The method of any of A1 to A8, comprising introducing the fracturing fluid comprising the carrier fluid and the coke proppant particles into the subterranean formation for at least one stage of the hydrocarbon well.

A10. The method of any of A1 to A9, further comprising, after introducing the fracturing fluid comprising the carrier fluid and the coke proppant particles into the subterranean formation during at least a portion of a pad phase of a hydraulic fracturing operation, introducing a second fracturing fluid comprising a second carrier fluid and non-coke proppant particles into the subterranean formation.

A11. The method of A10, wherein the non-coke proppant particles comprise at least one of sand, LWP, ULWP, and fly ash.

A12. The method of any of A1 to A11, wherein the fracturing fluid further comprises non-coke proppant particles, and wherein the method comprises introducing the fracturing fluid comprising the carrier fluid, the coke proppant particles, and the non-coke proppant particles into the subterranean formation during at least a portion of a pad phase of a hydraulic fracturing operation, as well as during at least a portion of a remainder of the hydraulic fracturing operation.

A13. The method of A12, wherein the non-coke proppant particles comprise at least one of sand, LWP, ULWP, and fly ash.

A14. The method of any of A1 to A13, wherein the fracturing fluid has a viscosity no greater than 50 cP at 25° C.

A15. The method of any of A1 to A14, wherein the fracturing fluid is essentially free of a viscosifying agent.

A16. The method of any of A1 to A15, further comprising producing hydrocarbon fluids from the subterranean formation subsequent to the hydraulic fracturing of the subterranean formation.

B1. A hydrocarbon well, comprising: a wellbore that extends within a subterranean formation; a production casing string that extends within the wellbore; perforation clusters formed within the production casing string; hydraulic fractures formed in the subterranean formation proximate to the perforation clusters; and a fracturing fluid comprising coke proppant particles and a carrier fluid within at least a portion of the hydraulic fractures, wherein the carrier fluid has a base viscosity of at most 0.8 cP at 25° C.

B2. The hydrocarbon well of B1, wherein the carrier fluid comprises $CO_2$, NG, NGL, LPG, $N_2$, or any mixture of two or more thereof.

B3. The hydrocarbon well of B1 or B2, wherein the carrier fluid comprises CNG, LNG, $LN_2$, NGL, LPG, or any mixture of two or more thereof.

B4. The hydrocarbon well of any of B1 to B3, wherein the carrier fluid comprises a single light hydrocarbon.

B5. The hydrocarbon well of any of B1 to B4, wherein the carrier fluid comprises an energized carrier fluid.

C1. A method, comprising: (a) providing a carrier fluid having a viscosity of at most 0.8 cP at 25° C.; and (b) forming a fracturing fluid comprising the carrier fluid and coke proppant particles.

C2. The method of C1, wherein step (b) comprising mixing the carrier fluid with the coke proppant particles, optional non-coke proppant particles, and at least one auxiliary component.

C3. The method of C1 or C2, further comprising: (c) injecting the fracturing fluid into a subterranean formation.

C4. The method of any of C1 to C3, wherein the carrier fluid comprises $CO_2$, NG, NGL, LPG, $N_2$, or any mixture of two or more thereof.

C5. The method of any of C1 to C4, wherein the carrier fluid comprises CNG, LNG, $LN_2$, NGL, LPG, or any mixture of two or more thereof.

C6. The method of any of C1 to C5, wherein the carrier fluid comprises a single light hydrocarbon.

C7. The method of any of C1 to C6, wherein the carrier fluid comprises an energized carrier fluid.

C8. The method of C7, wherein the energized carrier fluid comprises an aqueous carrier fluid that is 10% to 90% gas by volume.

C9. The method of any of C1 to C8, wherein the coke proppant particles comprise at least one of: fluid coke; flexicoke; delayed coke; thermally post-treated coke; pyrolysis coke; and coal-derived coke.

C10. The method of any of C1 to C9, wherein the coke proppant particles comprise microproppant coke particles.

C11. The method of any of C1 to C10, wherein the fracturing fluid has a viscosity no greater than 50 cP at 25° C.

C12. The method of any of C1 to C11, wherein the fracturing fluid is essentially free of a viscosifying agent.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A method, comprising hydraulically fracturing a subterranean formation by introducing a fracturing fluid comprising coke proppant particles and a carrier fluid into the subterranean formation, wherein the carrier fluid has a base viscosity of at most 0.5 centipoise (cP) at 25 degrees Celsius (° C.).

2. The method of claim 1, wherein the carrier fluid comprises carbon dioxide ($CO_2$), natural gas (NG), natural gas liquids (NGL), liquified petroleum gas (LPG), nitrogen ($N_2$), or any mixture of two or more thereof.

3. The method of claim 1, wherein the carrier fluid comprises compressed natural gas (CNG), liquified natural gas (LNG), liquified nitrogen ($LN_2$), natural gas liquids (NGL), liquified petroleum gas (LPG), or any mixture of two or more thereof.

4. The method of claim 1, wherein the carrier fluid comprises a single light hydrocarbon.

5. The method of claim 1, wherein the carrier fluid comprises an energized carrier fluid.

6. The method of claim 5, wherein the energized carrier fluid comprises an aqueous carrier fluid that is 10% to 90% gas by volume.

7. The method of claim 1, wherein the coke proppant particles comprise at least one of:
   fluid coke;
   flexicoke;
   delayed coke;
   thermally post-treated coke;
   pyrolysis coke; and
   coal-derived coke.

8. The method of claim 1, wherein the coke proppant particles comprise microproppant coke particles having sizes smaller than 100 µm.

9. The method of claim 1, comprising introducing the fracturing fluid comprising the carrier fluid and the coke proppant particles into the subterranean formation for at least one stage of a hydrocarbon well.

10. The method of claim 1, further comprising, after introducing the fracturing fluid comprising the carrier fluid and the coke proppant particles into the subterranean formation during at least a portion of a pad phase of a hydraulic fracturing operation, introducing a second fracturing fluid comprising a second carrier fluid and non-coke proppant particles into the subterranean formation.

11. The method of claim 10, wherein the non-coke proppant particles comprise at least one of sand, lightweight proppant (LWP), ultra-lightweight proppant (ULWP), and fly ash.

12. The method of claim 1, wherein the fracturing fluid further comprises non-coke proppant particles, and wherein the method comprises introducing the fracturing fluid comprising the carrier fluid, the coke proppant particles, and the non-coke proppant particles into the subterranean formation during at least a portion of a pad phase of a hydraulic fracturing operation, as well as during at least a portion of a remainder of the hydraulic fracturing operation.

13. The method of claim 12, wherein the non-coke proppant particles comprise at least one of sand, lightweight proppant (LWP), ultra-lightweight proppant (ULWP), and fly ash.

14. The method of claim 1, wherein the fracturing fluid has a viscosity no greater than 50 cP at 25° C.

15. The method of claim 1, wherein the fracturing fluid is essentially free of a viscosifying agent.

16. The method of claim 1, further comprising producing hydrocarbon fluids from the subterranean formation subsequent to the hydraulic fracturing of the subterranean formation.

17. The method of claim 1, wherein the carrier fluid has a base viscosity of at most 0.1 centipoise (cP) at 25° C.

18. The method of claim 1, wherein the carrier fluid is selected from carbon dioxide ($CO_2$), natural gas (NG), natural gas liquids (NGL), liquified petroleum gas (LPG), nitrogen ($N_2$), or any mixture of two or more thereof.

19. A hydrocarbon well, comprising:
a wellbore that extends within a subterranean formation;
a production casing string that extends within the wellbore;
perforation clusters formed within the production casing string;
hydraulic fractures formed in the subterranean formation proximate to the perforation clusters; and
a fracturing fluid comprising coke proppant particles and a carrier fluid within at least a portion of the hydraulic fractures, wherein the carrier fluid has a base viscosity of at most 0.5 centipoise (cP) at 25 degrees Celsius (° C.).

20. The hydrocarbon well of claim 19, wherein the carrier fluid comprises carbon dioxide ($CO_2$), natural gas (NG), natural gas liquids (NGL), liquified petroleum gas (LPG), nitrogen ($N_2$), or any mixture of two or more thereof.

21. The hydrocarbon well of claim 19, wherein the carrier fluid comprises compressed natural gas (CNG), liquified natural gas (LNG), liquified nitrogen ($LN_2$), natural gas liquids (NGL), liquified petroleum gas (LPG), or any mixture of two or more thereof.

22. The hydrocarbon well of claim 19, wherein the carrier fluid comprises a single light hydrocarbon.

23. The hydrocarbon well of claim 19, wherein the carrier fluid comprises an energized carrier fluid.

24. A method comprising:
(a) providing a carrier fluid having a viscosity of at most 0.5 centipoise (cP) at 25 degrees Celsius (° C.); and
(b) forming a fracturing fluid comprising the carrier fluid and coke proppant particles.

25. The method of claim 24, wherein step (b) comprises mixing the carrier fluid with the coke proppant particles and at least one auxiliary component.

26. The method of claim 24, further comprising:
(c) injecting the fracturing fluid into a subterranean formation.

27. The method of claim 24, wherein the carrier fluid comprises carbon dioxide ($CO_2$), natural gas (NG), natural gas liquids (NGL), liquified petroleum gas (LPG), nitrogen ($N_2$), or any mixture of two or more thereof.

28. The method of claim 24, wherein the carrier fluid comprises compressed natural gas (CNG), liquified natural gas (LNG), liquified nitrogen ($LN_2$), natural gas liquids (NGL), liquified petroleum gas (LPG), or any mixture of two or more thereof.

29. The method of claim 24, wherein the carrier fluid comprises a single light hydrocarbon.

30. The method of claim 24, wherein the carrier fluid comprises an energized carrier fluid.

31. The method of claim 30, wherein the energized carrier fluid comprises an aqueous carrier fluid that is 10% to 90% gas by volume.

32. The method of claim 24, wherein the coke proppant particles comprise at least one of:
fluid coke;
flexicoke;
delayed coke;
thermally post-treated coke;
pyrolysis coke; and
coal-derived coke.

33. The method of claim 24, wherein the coke proppant particles comprise microproppant coke particles having sizes smaller than 100 μm.

34. The method of claim 24, wherein the fracturing fluid has a viscosity no greater than 50 cP at 25° C.

35. The method of claim 24, wherein the fracturing fluid is essentially free of a viscosifying agent.

* * * * *